(12) United States Patent
Takada et al.

(10) Patent No.: US 8,091,612 B2
(45) Date of Patent: Jan. 10, 2012

(54) METHOD FOR MANUFACTURING CLAD MATERIAL AND EQUIPMENT FOR MANUFACTURING THE SAME

(75) Inventors: Masayuki Takada, Moka (JP); Yasuhiro Nishioka, Moka (JP); Tomohiro Nishimura, Moka (JP); Kenji Tokuda, Moka (JP); Toshiki Ueda, Moka (JP); Makoto Morishita, Moka (JP); Takashi Inaba, Moka (JP); Akihiro Tsuruno, Moka (JP); Yoshinori Kato, Moka (JP); Fumihiro Koshigoe, Moka (JP); Masaki Tanigawa, Moka (JP); Naoki Sakashita, Moka (JP); Kenji Harada, Moka (JP); Jitsuto Shikata, Moka (JP); Masanori Ikeda, Moka (JP)

(73) Assignee: Kobe Steel, Ltd., Kobe-shi (JP)

( * ) Notice: Subject to any disclaimer, the term of this patent is extended or adjusted under 35 U.S.C. 154(b) by 734 days.

(21) Appl. No.: 12/095,983

(22) PCT Filed: Dec. 7, 2006

(86) PCT No.: PCT/JP2006/324429
§ 371 (c)(1),
(2), (4) Date: Jun. 3, 2008

(87) PCT Pub. No.: WO2007/066714
PCT Pub. Date: Jun. 14, 2007

(65) Prior Publication Data
US 2009/0130481 A1 May 21, 2009

(30) Foreign Application Priority Data

| | | |
|---|---|---|
| Dec. 9, 2005 | (JP) | 2005-356810 |
| Feb. 28, 2006 | (JP) | 2006-054205 |
| Feb. 28, 2006 | (JP) | 2006-054206 |
| Feb. 28, 2006 | (JP) | 2006-054207 |
| Feb. 28, 2006 | (JP) | 2006-054208 |
| Feb. 28, 2006 | (JP) | 2006-054209 |
| Jun. 30, 2006 | (JP) | 2006-182868 |
| Jun. 30, 2006 | (JP) | 2006-182869 |
| Jun. 30, 2006 | (JP) | 2006-182870 |
| Jun. 30, 2006 | (JP) | 2006-182871 |
| Jun. 30, 2006 | (JP) | 2006-182872 |
| Jun. 30, 2006 | (JP) | 2006-182873 |

(51) Int. Cl.
*B22D 11/00* (2006.01)
*B22D 11/12* (2006.01)
*B22D 11/126* (2006.01)
*B22D 19/16* (2006.01)

(52) U.S. Cl. .......... 164/461; 164/476; 164/95

(58) Field of Classification Search .......... 164/461, 164/476, 91, 94, 95, 98
See application file for complete search history.

(56) References Cited

U.S. PATENT DOCUMENTS 4,567,936 A * 2/1986 Binczewski .......... 164/453
(Continued)

FOREIGN PATENT DOCUMENTS

CA 2 376 273 A1 1/2001
(Continued)

OTHER PUBLICATIONS

Chinese Office Action issued Aug. 4, 2010 in corresponding Chinese Application No. 200680040182 (with an English translation).
(Continued)

*Primary Examiner* — Kevin P Kerns
(74) *Attorney, Agent, or Firm* — Oblon, Spivak, McClelland, Maier & Neustadt, L.L.P.

(57) ABSTRACT

A method for manufacturing a clad material composed of a core material and one or more skin materials which are superposed on either one or both faces of the core material, includes a clad material preparation process where an ingot for core material is manufactured by melting and casting a metal, and an ingot for skin material is manufactured by melting and casting a different metal for skin material, without hot rolling. The ingot for skin material is superposed as a skin material at a predetermined position of either one or both faces of the ingot for core material and the superposed material is hot-rolled to manufacture a clad material.

18 Claims, 13 Drawing Sheets

U.S. PATENT DOCUMENTS

| | | | |
|---|---|---|---|
| 5,125,452 A * | 6/1992 | Yamauchi et al. | 165/133 |
| 6,129,143 A | 10/2000 | Hasegawa et al. | |
| 6,352,789 B1 | 3/2002 | Hurd et al. | |
| 6,387,540 B1 | 5/2002 | Yoshidomi et al. | |
| 7,762,310 B2 * | 7/2010 | Bull et al. | 164/461 |
| 7,938,165 B2 * | 5/2011 | Lequeu et al. | 164/461 |
| 2005/0011630 A1 * | 1/2005 | Anderson et al. | 164/461 |
| 2005/0079376 A1 | 4/2005 | Benedictus et al. | |

FOREIGN PATENT DOCUMENTS

| | | |
|---|---|---|
| EP | 1 484 425 A1 | 12/2004 |
| JP | 54 99762 | 8/1979 |
| JP | 63 112084 | 5/1988 |
| JP | 1 262091 | 10/1989 |
| JP | 8 260085 | 10/1996 |
| JP | 2000 263282 | 9/2000 |
| JP | 2000-263282 | 9/2000 |
| JP | 2000 280089 | 10/2000 |
| JP | 2003 503214 | 1/2003 |
| JP | 2005 232507 | 9/2005 |
| RU | 2 158 641 C1 | 11/2000 |
| RU | 2 234 385 C1 | 8/2004 |
| SU | 1479241 A1 | 5/1989 |
| WO | WO 01/02165 A1 | 1/2001 |

OTHER PUBLICATIONS

Communication pursuant to Article 94(3) EPC issued Mar. 11, 2011, in Application No. 06 834 184.1-2302.

* cited by examiner

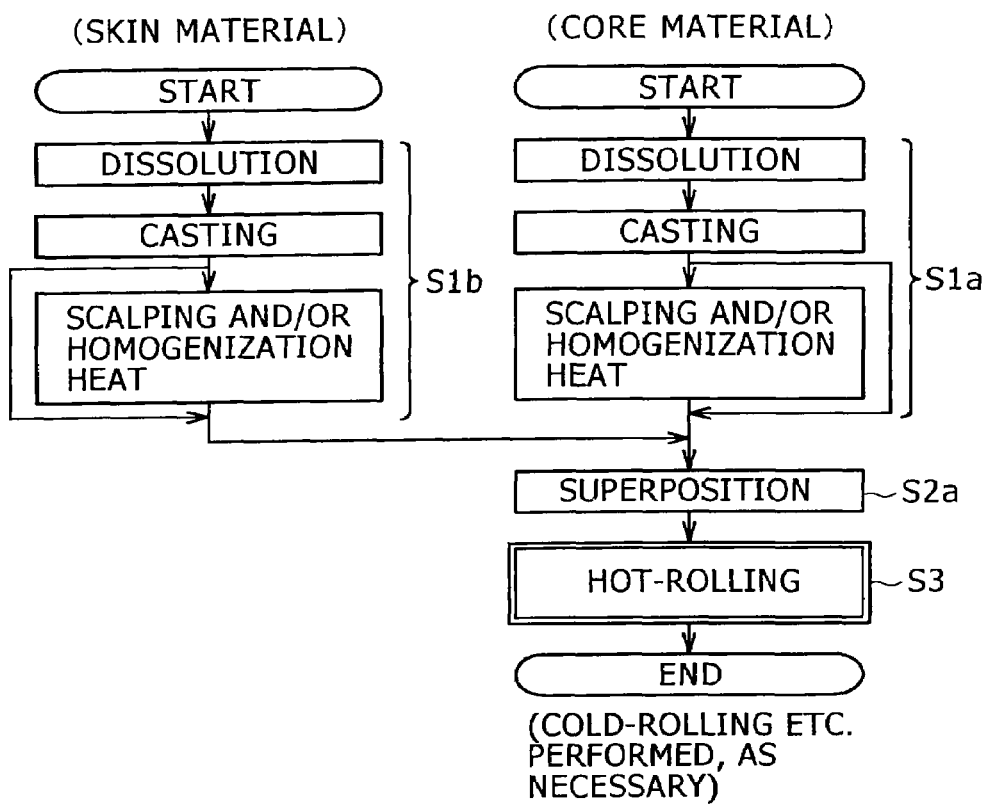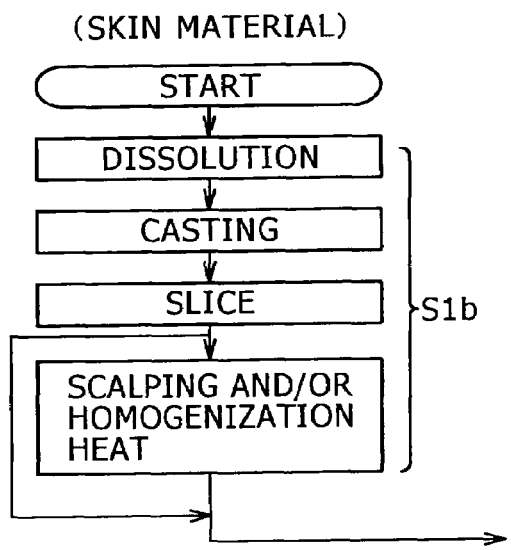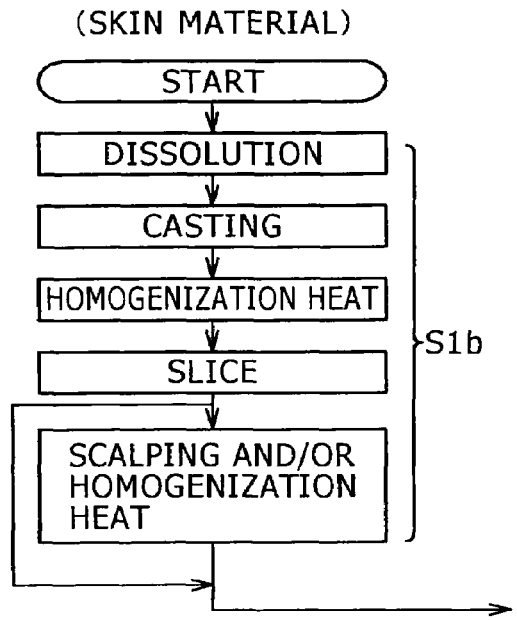

METHOD FOR MANUFACTURING CLAD MATERIAL AND EQUIPMENT FOR MANUFACTURING THE SAME

TECHNICAL FIELD

The present invention relates to a method for manufacturing a clad material used for heat exchangers of vehicles or the like, and the equipment for manufacturing the same.

BACKGROUND ART

In general, for clad materials for heat exchangers used for intercoolers, oil coolers, radiators, condensers, evaporators and heater cores or the like of vehicles, rolled skin materials are used. For example, a conventional method for manufacturing a typical clad material for heat exchangers is described in Patent Document 1, as follows: At first, an aluminum alloy for core material and an aluminum alloy for skin material (sacrificial anode material and filler material in Patent Document 1) are melted (hereafter referred to as "dissolved") and cast by the continuous casting, and a heat treatment for homogenization is performed as necessary. Aluminum alloy ingots for skin material are hot-rolled so as to have a predetermined thickness, respectively (see S11$a$ and S11$b$ in FIG. 14: Note that a heat treatment for homogenization is described as "homogenization heat"). Subsequently, the aluminum alloy ingot for core material and the hot-rolled plates for skin material (member for skin material) are superposed one on another (see S12 in FIG. 14), then are hot-rolled (clad hot-rolling: see S13 in FIG. 14) according to a common method to make a clad material.

[Patent Document 1] Japanese Unexamined Patent Application Publication No. 2005-232507 (paragraphs 0037, 0039, and 0040).

DISCLOSURE OF THE INVENTION

Problems to be Solved by the Invention

However, a typical clad material manufactured by the above methods has following problems.

(1) Because a hot-rolled plate is used for a skin material, the number of executions of hot-rolling in a process of manufacturing a clad material is increased, resulting in the decreased productivity.

(2) An ingot for core material is mostly subjected to a scalping process by a milling machine or the like, therefore the surfaces thereof are scalping-processed faces. On the other hand, the surfaces of a hot-rolled plate for skin material are rolling-processed faces in which rolled lines are formed along the rolling direction. Accordingly, there is a difference in their surface states between an ingot for core material and a hot-rolled plate for skin material, therefore there has been a problem in that deterioration in adhesion between the core material and the skin material tends to occur when both are superposed one on another and subjected to a clad hot-rolling process. In order to improve the adhesion property between the core material and the skin material, a multi-pass rolling under a slight pressure is needed in the clad hot-rolling process, resulting in the decreased productivity.

(3) When a hot-rolled material is used as a member for skin material, the surface state and the flatness (in particular, the flatness in the lengthwise direction) of the hot-rolled member are controlled only by the hot-rollers, and an oxide film is formed on the surface of the rolled plate due to the execution of the hot-rolling, therefore it is difficult to control the surface state and the flatness of the rolled plate, resulting in a problem in that deterioration in adhesion between a core material and the skin material cannot be prevented.

(4) When deterioration in adhesion between a core material and a skin material occurs, several problems accompany that as follows: the productivity of clad members is decreased; a predetermined clad rate cannot be obtained; the quality is deteriorated in which an abnormality in quality, such as blistering, occurs; and the corrosion resistance is decreased because of the deterioration in adhesion.

The present invention has been made in view of the above problems, and a general purpose of the invention is to provide a method for manufacturing a clad material and the equipment for manufacturing the clad material, in which the productivity is excellent, the surface state and the flatness of a member for skin material can be readily controlled, and the deterioration in adhesion rarely occurs.

Means for Solving the Problems

In order to solve the afore-mentioned problems, the first embodiment of a method for manufacturing a clad material composed of a core material and one or more skin materials that are superposed on either one or both faces of the core material, includes: a clad material preparation process where an ingot for core material, which is manufactured by dissolving and casting a metal for core material in a core material preparation process, and an ingot for skin material, which is manufactured by dissolving and casting a metal for skin material different from the core material in their component compositions, in a skin material preparation process, are prepared respectively; a superposition process where the ingot for skin material is superposed as a skin material at a predetermined position of either one or both faces of the ingot for core material to manufacture a superposed material; and a clad hot-rolling process where the superposed material is hot-rolled to manufacture a clad material.

When a clad material is manufactured in such procedures, the hot-rolling in manufacturing the member for skin material is not needed because an ingot for skin material is used as the member for skin material (skin material). Thus, the number of executions of the hot-rolling can be reduced and the labor saving in operation processes can be attained, as well as the surface state and the flatness of the clad material can be readily controlled, in comparison with a conventional method for manufacturing a clad material in which the hot-rolling is performed in manufacturing a skin material. In addition, because an ingot for skin material is superposed on an ingot for core material, the surface states of the two ingots are identical, leading to an improved adhesion property. Moreover, because of the improved adhesion property, a multi-pass rolling is not needed in the clad hot-rolling process.

In the skin material preparation process, it is preferable that at least one of the skin materials is manufactured by a slice process in which an ingot for skin material, which is manufactured by being dissolved and cast, is sliced into a predetermined thickness.

When a clad material is manufactured in such procedures, because a sliced skin material is used as a skin material, it is not needed that the thickness of the skin material is reduced by the hot-rolling as with a conventional clad material, therefore the number of executions of the hot-rolling can be reduced and the labor saving in the operation processes can be attained, as well as the surface state and the flatness of the clad material can be readily controlled, in comparison with a conventional method for manufacturing a clad material.

It is preferable that the ingot for skin material manufactured by being dissolved and cast is further subjected to a heat treatment for homogenization, prior to the slice process. When a clad material is manufactured in such procedures, the internal stress of the ingot for skin material is removed, leading to an improved flatness of the sliced skin material and to an improved adhesion property between the core material and the skin material.

In the slice process, it is preferable that the ingot for skin material is sliced in parallel to an installation face of the ingot for skin material installed horizontally. When a clad material is manufactured in such procedures, the influence by the weight of a cut lump (slice lump), or by the displacement by a shape (for example, the force produced when the cut lump is falling down, etc.), is minimized, therefore, the flatness of the sliced skin material is improved, leading to an improved adhesion property between the core material and the skin material.

In the core material preparation process, it is preferable that at least one of a scalping process and a heat treatment for homogenization is performed on the manufactured ingot for core material. When a clad material is manufactured in such procedures, the surface state and the flatness of the ingot for core material are improved, leading to an improved adhesion property between the core material and the skin material.

In the skin material preparation process, it is preferable that at least one of a scalping process and a heat treatment for homogenization is performed on the manufactured skin material. When a clad material is manufactured in such procedures, the surface state and the flatness of the skin material can be improved, leading to an improved adhesion property between the core material and the skin material.

It is preferable that at least one of the skin materials has the flatness of equal to or less than 1 mm per 1 m in the lengthwise direction. When a clad material is manufactured in such procedures, the flatness of the skin material can be more improved by controlling the flatness thereof to be equal or less than a predetermined value, leading to an improved adhesion property between the core material and the skin material.

It is preferable that at least one of the skin materials has the arithmetic mean roughness (Ra) of a surface roughness in the range of 0.05 to 1.0 µm. When a clad material is manufactured in such procedures, a gap between the core material and each skin material is rarely formed, leading to a more improved adhesion property.

It is preferable that the thickness of the ingot for core material is in the range of 200 to 700 mm and the thickness of the skin material is in the range of 3 to 200 mm. When a clad material is manufactured in such procedures, the clad rate of the clad material can be appropriately adjusted by specifying thicknesses of the ingot for core material and the rolled plate for skin material in certain ranges.

It is preferable that the metal for core material and the metal for skin material are aluminum or aluminum alloys. When a clad material is manufactured in such procedures, because the metal for core material and the metal for skin material are aluminum or aluminum alloys, the processability in each process improves, the adhesion property between the core material and the skin material are improved, and the clad rate of the clad material can be appropriately adjusted.

It is preferable that the skin material is composed of a plurality of layers, and at least one of the layers of the skin materials is manufactured by the skin material preparation process.

It is preferable that, after the slice process, the surface of the sliced skin material having a predetermined thickness is further subjected to a surface smoothing treatment. When a skin material is manufactured by such processes, the surface state and the flatness of the skin material are improved, leading to an improved adhesion property between the core material and the skin material. Moreover, the pressure-bonding property is improved, leading to the reduction of the number of passes of the pressure-bonding.

It is preferable that the surface smoothing treatment is performed by one or more methods selected from a cutting method, a grinding method, and a polishing method. When a skin material is manufactured by such processes, the surface state and the flatness of the skin material are improved, leading to an improved adhesion property between the core material and the skin material. Moreover, the pressure-bonding property is improved, leading to the reduction of the number of passes of the pressure-bonding.

It is preferable that the method for manufacturing the clad material further includes a cold-rolling process where cold-rolling is performed after the hot-rolling process.

It is preferable that: at least one layer of the skin material is a filler material; the filler material is provided so as to be placed on the side of the most outer surface in the clad material; and at least one layer of the skin material including the filler material is manufactured by the skin material preparation process.

It is preferable that: the skin material is provided with the filler material and an intermediate material which is provided between the core material and the filler material; the filler material is provided so as to be placed on the side of the most outer surface in the clad material; and at least one layer of the skin material including the filler material and the intermediate material is manufactured by the skin material preparation process.

It is preferable that: the clad material is composed of the core material and the skin materials which are superposed on both faces of the clad material; at least one layer of the skin materials on one face of the core material is a filler material, and at least one layer of the skin materials on the other face of the core material is a sacrificial material, and the filler material and the sacrificial material are provided so as to be placed on the side of the most outer face in each face of the core material; and at least one layer of the skin materials including the filler material and at least one layer of the skin materials including the sacrificial material are manufactured by the skin material preparation process, respectively.

It is preferable that: the clad material is composed of the core material and the skin materials which are superposed on both faces of the core material; the skin material on one face of the core material is provided with a filler material and an intermediate material which is provided between the core material and the filler material, and at least one layer of the skin materials on the other face of the core material is a sacrificial material, and the filler material and the sacrificial material are provided so as to be placed on the side of the most outer surface in each face of the core material; and at least one layer of the skin materials including the filler material and the intermediate material, and at least one layer of the skin materials including the sacrificial material, are manufactured by the skin material preparation process, respectively.

In order to solve the afore-mentioned problems, the equipment for manufacturing a skin material of the second embodiment of the present invention is the equipment for manufacturing a skin material used in a clad material composed of a core material and one or more layers of the skin materials superposed on either one or both faces of the core material, the equipment including: a casting apparatus which dissolves a metal for skin material different from the core material in their component compositions, and casts the skin material; an ingot-cutting apparatus which cuts an ingot for skin material which is cast by the casting apparatus; and a conveying apparatus which conveys the ingot for skin material among each apparatus, wherein the ingot-cutting apparatus is a slicing apparatus which slices the ingot for skin material into a predetermined thickness.

When using such equipment for manufacturing a skin material, an ingot for skin material is cast by the casting apparatus and sliced into a predetermined thickness by a slicing apparatus which is the ingot-cutting apparatus. And, the ingot for skin material is conveyed among each apparatus by the conveying apparatus.

It is preferable that the slicing apparatus is an apparatus which slices the ingot for skin material installed horizontally, in parallel to the installation face of the ingot for skin material.

When using such equipment for manufacturing a skin material, an ingot for skin material is cast by the casting apparatus and sliced into a predetermined thickness in parallel to the installation face of the ingot for skin material which is installed horizontally, by the slicing machine which is the ingot-cutting apparatus. And, the ingot for skin material is conveyed among each apparatus by the conveying apparatus.

It is preferable that the equipment for manufacturing a skin material further includes an apparatus for surface smoothing treatment which performs a surface smoothing treatment on the skin material having a predetermined thickness which is cut by the ingot-cutting apparatus.

When using such equipment for manufacturing a skin material, an ingot for skin material is cast by the casting apparatus and sliced into a predetermined thickness by the slicing apparatus which is the ingot-cutting apparatus. And, the skin material having a predetermined thickness which is cut by the ingot-cutting apparatus, is subjected to a surface smoothing treatment by the apparatus for surface smoothing treatment, and the ingot for skin material or the skin material is conveyed among each apparatus by the conveying apparatus.

It is preferable that the equipment for manufacturing a skin material is further provided with an apparatus for heat treatment for homogenization which performs a heat treatment for homogenization on the ingot for skin material cast by the casting apparatus. When using such equipment for manufacturing a skin material, an ingot for skin material cast by the casting apparatus is subjected to a heat treatment for homogenization by the apparatus for heat treatment for homogenization.

It is preferable that the ingot-cutting apparatus includes the slicing apparatus and a cutting apparatus which cuts the ingot for skin material at the front and the back portions thereof into a predetermined length. When using such equipment for manufacturing a skin material, an ingot for skin material has a predetermined length with the front and the back portions thereof being cut by the cutting apparatus, and is sliced into a predetermined thickness by the slicing apparatus.

In order to solve the afore-mentioned problems, a skin material for the clad material of the third embodiment of the present invention is a skin material for clad material, which is used in the method for manufacturing a clad material of the first embodiment, and the skin material for clad material is characterized in that: the skin material for clad material is composed of one or more layers; each layer of the skin material is made of a metal different from the core material in their component compositions; and at least one layer of the skin material has a cast microstructure when the skin material is superposed on either of one or both faces of the core material.

When a skin material is structured in such a way, the surface state and the flatness of the skin material can be readily controlled because at least one layer of the skin material has a cast microstructure. As a result, when superposing a core material and a skin material one on another, a gap between the core material and the skin material or between the skin materials is rarely formed, leading to the improved adhesion and press-bonding properties. In particular, because the faces of the core material and the skin material which are superposed one on another, are identical in their crystal structures, the adhesion property between them can be improved. And, because of the improved adhesion property, the press-bonding property can be improved in the clad hot-rolling process of both materials and the number of passes of the press-bonding is reduced, therefore leading to the improved yield rate and the improved productivity. In addition, a skin material is not required to be manufactured by the hot-rolling like a conventional clad material, therefore the number of executions of the hot-rolling can be reduced and the labor saving in operation processes can be attained. Moreover, because the hot-rolling is not performed, the thickness of an oxide film is decreased, leading to an improved adhesion property between the core material and the skin material. Thereby, the corrosion resistance of the clad material can be improved.

It is preferable that the skin material is made of a 1000-series aluminum alloy in accordance with the JIS standard, or of various aluminum alloys outside the JIS standard. Examples of the aluminum alloys outside the JIS standard include, an Al—Mn system, an Al—Mn—Cu system, an Al—Mn—Si system, an Al—Mn—Cu—Si system, an Al—Mn—Mg system, an Al—Mn—Mg—Cu system, an Al—Mn—Mg—Si system, an Al—Mn—Mg—Cu—Si system, an Al—Zn system, an Al—Mg—Zn system, an Al—Si—Zn system, an Al—Si—Mn—Zn system, an Al—Si—Mg—Zn system, an Al—Si—Mn—Mg—Zn system, an Al—Mn—Zn system, an Al—Mn—Si—Zn system, an Al-3-10 Si alloy, and an Al-3-10 Si—Zn alloy. Such aluminum alloys may further contain 0.05-0.3% of Sc, 0.05-0.3% of Zr, 0.05-0.3% of Ti, or 0.001-0.1 of Sr. When a skin material is structured in such a way, the processability of the skin material can be improved, therefore the clad rate of the clad material can be appropriately adjusted, as well as the adhesion property between the core material and the skin material can be further improved when superposing the core material and the skin material one on another.

It is preferable that at least one layer of the skin material has a cast microstructure and the thickness thereof is in the range of 10 to 250 mm. When the skin material is structured in such a way, the clad rate of the clad material can be appropriately adjusted by specifying the thickness of the skin material having a cast microstructure in a certain range.

According to the method for manufacturing a clad material of the fourth embodiment of the prevent invention, a method for manufacturing a clad material composed of a core material and two or more skin materials which are superposed on either one or both faces of the core material, the method for manufacturing a clad material including: a core material preparation process where an ingot for core material is manufactured by dissolving and casting a metal for core material; a skin material preparation process where an ingot for skin material is manufactured by dissolving and casting a metal for skin material different from the metal for core material in their component compositions; a rolled plate for skin material preparation process where a rolled plate for skin material is manufactured by further hot-rolling the ingot for skin material; a superposition process where a superposed material is manufactured by superposing the ingot for skin material and the rolled plate for skin material are superposed as skin materials at a predetermined position on either one or both faces of the ingot for core material; and a clad hot-rolling process where a clad material is manufactured by hot-rolling the superposed material.

When a clad material is manufactured in such procedures, the execution of the hot-rolling is not needed in manufacturing a member for skin material, because an ingot for skin material is used as one of the multiple members for skin material (skin materials). Thus, the number of executions of the hot-rolling can be reduced in manufacturing multiple members for skin material, in comparison with a conventional method for manufacturing a clad material, leading to a fact that the surface state and the flatness of the clad material can be readily controlled, as well as the labor saving in operation processes can be attained. In addition, because an ingot for skin material is superposed on an ingot for core material, the surface states of the two ingots are identical, leading to an improved adhesion property. Moreover, because of the improved adhesion property, execution of a multi-pass rolling is not needed in the clad hot-rolling process. In addition, because a hot-rolled plate is used as a member for skin material, a skin material and the equipment for manufacturing a skin material, which are used for a conventional clad material, can be used.

It is preferable that the thicknesses of the ingot for skin material and the hot-rolled plate for skin material are in the range of 3 to 200 mm.

Effect of the Invention

According to the method for manufacturing a clad material of the first embodiment of the present invention, because the number of the executions of the hot-rolling for manufacturing a clad material can be reduced, the surface state and the flatness of the member for skin material (skin material) can be readily controlled, as well as the productivity is excellent, thereby a clad material can be manufactured in which the deterioration in adhesion between the core material and the skin material rarely occurs. In addition, because a multi-pass rolling is not needed, a clad material excellent in productivity can be manufactured.

According to the equipment for manufacturing a skin material of the second embodiment of the present invention, a skin material is manufactured by being sliced by the slicing apparatus, therefore it is not needed that the thickness of the skin material is reduced by hot-rolling like a conventional clad material, thereby the labor saving in operation processes is attained without using the equipment for hot-rolling when manufacturing a skin material. In addition, a clad material can be manufactured in which: the surface state and the flatness thereof can be readily controlled; the thickness of an oxide film is reduced; the deterioration in adhesion rarely occurs when the skin material is superposed on the core material; and the corrosion resistance thereof is excellent.

According to the skin material for clad material of the third embodiment of the present invention, because at least one layer of the skin material has a cast microstructure, the deterioration in adhesion rarely occurs when the skin material is superposed on the core material, thereby a clad material excellent in the adhesion property and the productivity can be obtained. In addition, because it is not needed that the skin material is manufactured by hot-rolling like a conventional clad material, a clad material can be obtained in which: the surface state and the flatness thereof can be readily controlled; the thickness of an oxide film can be reduced; the deterioration in adhesion between the core material and the skin material rarely occurs; and the corrosion resistance thereof is excellent, as well as the number of executions of the hot-rolling can be reduced in comparison with a conventional method for manufacturing a clad material, thereby the labor saving in operation processes can be attained.

According to the method for manufacturing a clad material of the fourth embodiment of the present invention, because a hot-rolled plate for skin material is used as one of the members for skin material (skin materials), a clad material can be obtained in which: the surface state and the flatness the skin material can be readily controlled; and the deterioration in adhesion between the core material and the skin material rarely occurs, as well as the productivity thereof is excellent. In addition, a clad material can be manufactured at a cheap production cost.

BRIEF DESCRIPTION OF THE DRAWINGS

FIGS. 1($a$)-1($c$) are diagrams illustrating flows of methods for manufacturing a clad material according to the first embodiment of the present invention;

FIG. 8($b$) is a schematic diagram illustrating the outline of the clad hot-rolling process;

REFERENCE NUMERALS

S1$a$ Core material preparation process
S1$b$ Skin material preparation process
S1$c$ Skin material rolling process
S2$a$ and S2$b$ Superposition process
S3 Clad hot-rolling process
1$a$, 1$b$, 1$c$, and 1$d$ Clad material 2 Core Material
3 and 4 Skin material
17, 25, 34, and 35 Ingot (Ingot for core material, Ingot for skin material)

BEST MODE OF CARRYING OUT THE INVENTION

Figure 7A:
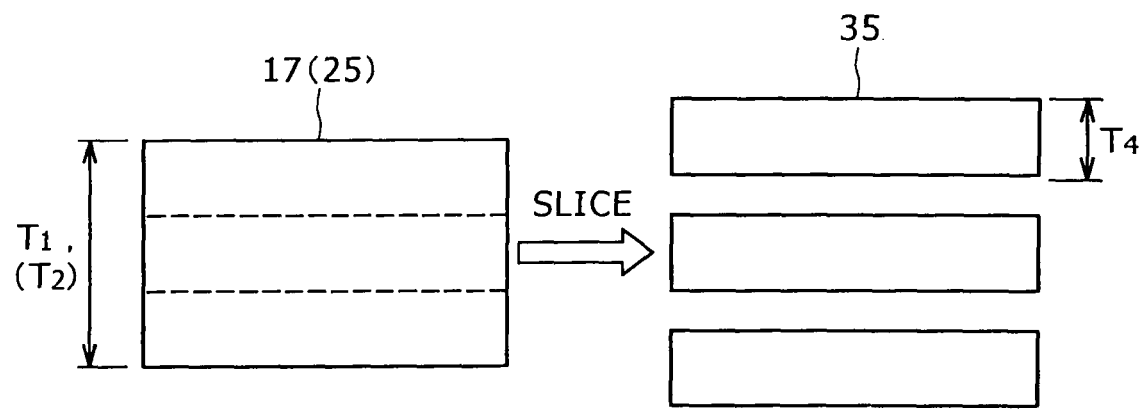
FIGS. 7($a$) and 7($b$) are schematic diagrams illustrating the outline of a method for slicing an ingot.
Figure 7B:
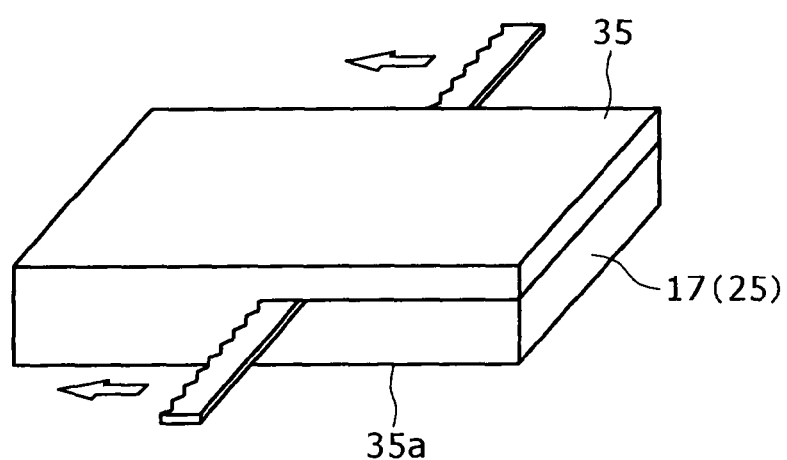
Figure 8A:
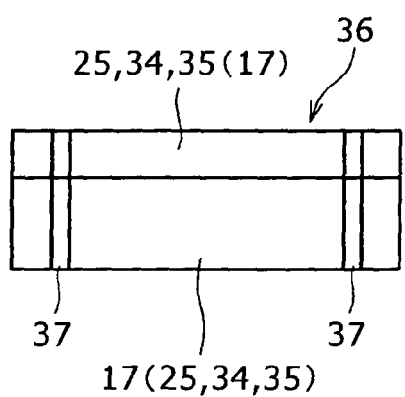
FIG. 8($a$) is a schematic diagram illustrating a structure of a superposed material.
Figure 8B:
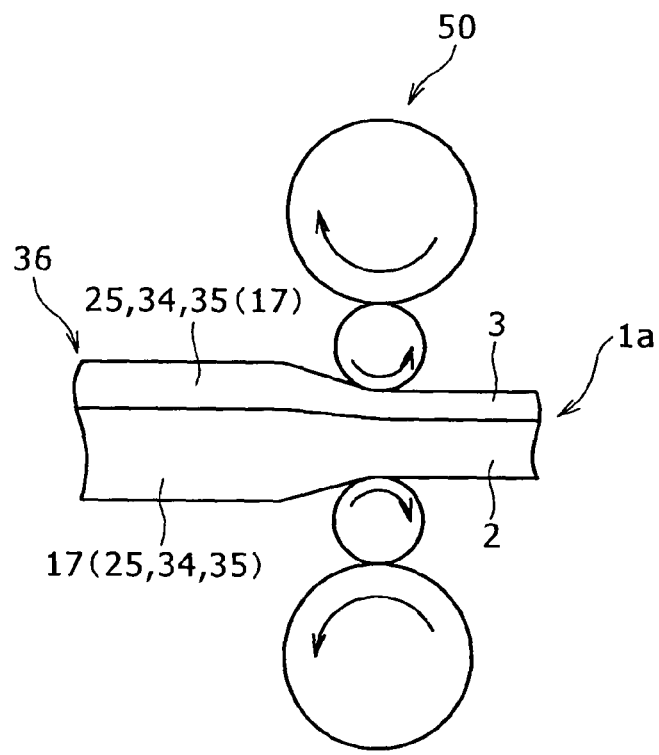

A method for manufacturing a clad material according to the present invention will be described in detail with reference to accompanying drawings. In the drawings to be referred to, FIG. 1(a), FIG. 1(b), FIG. 1(c), and FIG. 2 are diagrams illustrating flows of methods for manufacturing a clad material; FIG. 3 is a cross-sectional diagram illustrating the structure of a clad material; FIG. 4 to FIG. 7 are schematic diagrams illustrating the outlines of the core material preparation process or the skin material preparation process; FIG. 8(a) is a schematic diagram illustrating the structure of a superposed material; and FIG. 8(b) is a schematic diagram illustrating the outline of the clad hot-rolling process.

Figure 3A:
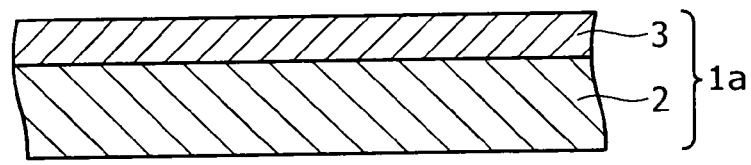
FIGS. 3($a$)-3($d$) are cross-sectional diagrams illustrating structures of a clad material according to the present invention.
Figure 3B:
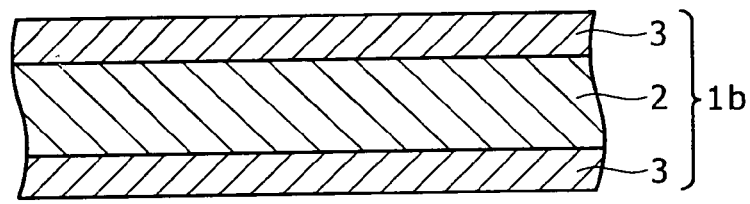
Figure 3C:
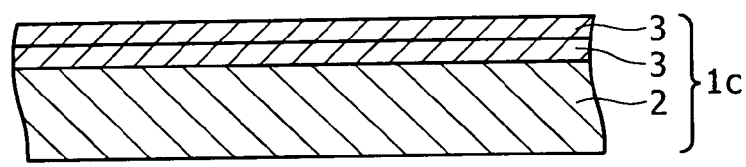
Figure 3D:
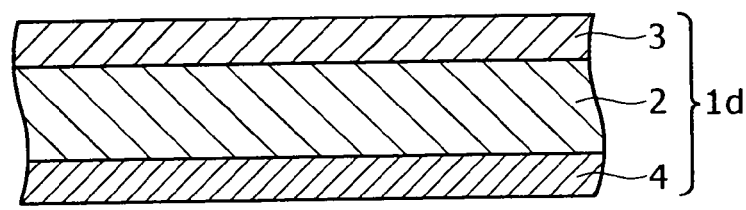

The method for manufacturing a clad material according to the present invention can be adopted in any clad as long as the clad is made of a core material and one or more skin materials which are superposed on either one or both faces of the core material, thereby the clad material being manufactured. Herein, the number of layers of the clad material is not limited at all, and the method can be preferably applied to: a two-layer clad material 1a in which one skin material 3 is clad on one face of the core material 2, as illustrated in FIG. 3(a); a three-layer clad material 1b in which two skin materials 3 and 3 are respectively clad on both faces of the core material 2, as illustrated in FIG. 3(b); a three-layer clad material 1c in which two skin materials 3, and 3 are clad on one face of the core material 2, as illustrated in FIG. 3(c); and a three-layer clad material 1d in which the skin material 3 and a conventional skin material 4 (skin material manufactured from a rolled plate) are respectively clad on both faces of the core material 2, as illustrated in FIG. 3(d); or the like. However, needless to say, the method can be preferably applied to a clad material having further increased layers, that is, a clad material having four or more layers.

In a clad material of the present invention, a metal for core material and a metal for skin material are different from each other in their "component compositions." "Metals different in their component compositions" include "metals of the same kind different in their component compositions" and "metals of different kinds different in their component compositions".

"Metals of the same kind different in their component compositions" means metals of which base materials are the same kind of metal and component compositions are different from each other. As for such metals, for example, like a clad material for heat exchangers, the case where a metal for core material is a 3000-series Al—Mn system aluminum alloy, while a metal for skin material is a 4000-series Al—Si system aluminum alloy (metal for filler material as a skin material), a 7000-series Al—Zn—Mg system aluminum alloy (metal for sacrificial material as a skin material), or a 1000-series pure aluminum (metal for intermediate material as a skin material), corresponds to this category. Alternatively, the cases where a core material is Al-0.5 Si-0.5 Cu-1.1 Mn-0.4 Mg while a skin material is Al-0.5 Si-0.5 Cu-1.1 Mn, or a core material is a 3000-series alloy such as Al-0.5 Si-0.5 Cu-1.1 Mn while a skin material is Al-0.5 Si-0.1 Cu-1.1 Mn or Al-0.5 Si-0.1 Cu-1.1 Mn-2.5 Zn, also correspond to the "metals of the same kind different in their component compositions". In addition, like a clad material used for a canned food, the case where a metal for core material is a 3000-series Al—Mn system aluminum alloy or a 5000-series Al—Mg system aluminum alloy, while a metal for skin material is a 1000-series pure aluminum, also corresponds to this category. Further, like a polished skin, the case where a metal for core material is a 2000-series Al—Cu system aluminum alloy, while a metal for skin material is a 1000-series pure aluminum, also corresponds to this category.

"Metals of different kinds different in their component compositions" means metals of which base materials are of different kinds. An example of such metals includes, for example, a metal containing a copper alloy or a steel instead of an aluminum alloy. A component composition of the aforementioned metals can be appropriately adjusted in accordance with an application of a clad material to be used, and so forth.

Hereafter, the embodiments of the method for manufacturing a clad material of the present invention is described in detail.

1. First Embodiment

The method for manufacturing a clad material according to First Embodiment is a method for manufacturing a clad material composed of a core material and one or more skin materials that are superposed on either one or both faces of the core material, and, for example, clad materials 1a, 1b, and 1c described in FIGS. 3(a)-3(c) are manufactured by the method. As illustrated in FIGS. 1(a)-1(c), the method for manufacturing a clad material according to First Embodiment includes: the clad material preparation process composed of the core material preparation process S1a and the skin material preparation process S1b; the superposition process S2a; and the clad hot-rolling process S3. Hereinafter, each process will be described.

[Clad Material Preparation Process]

The clad material preparation process is a process in which the ingot for core material manufactured in the core material preparation process S1a, and the ingot for skin material manufactured in the skin material preparation process S1b, are prepared. In the clad material preparation process, either of the ingot for core material or the ingot for skin material may be manufactured and prepared at first, or the both preparation processes S1a and S1b may be advanced and prepared at a same time.

(1) Core Material Preparation Process: S1a

In the core material preparation process S1a, a metal for core material is dissolved and cast so that an ingot for core material is manufactured. Herein, the metal for core material is a metal of which component composition is described before. The ingot is preferably manufactured by the semi-continuous casting method which is described later. However, a casting method is not limited to the semi-continuous casting method, and in manufacturing, for example, a clad material of which core material has a thin thickness, the thin slab casting method, the twin-roll casting method, or the slab slice method, which are described later, may be adopted. In addition, the width and the length of the ingot for core material is not particularly limited; however, the width is preferably in the range of 1000 to 2500 mm, and the length preferably in the range of 3000 to 10000 mm, in view of productivity.

(Semi-continuous Casting Method)

Figure 4:
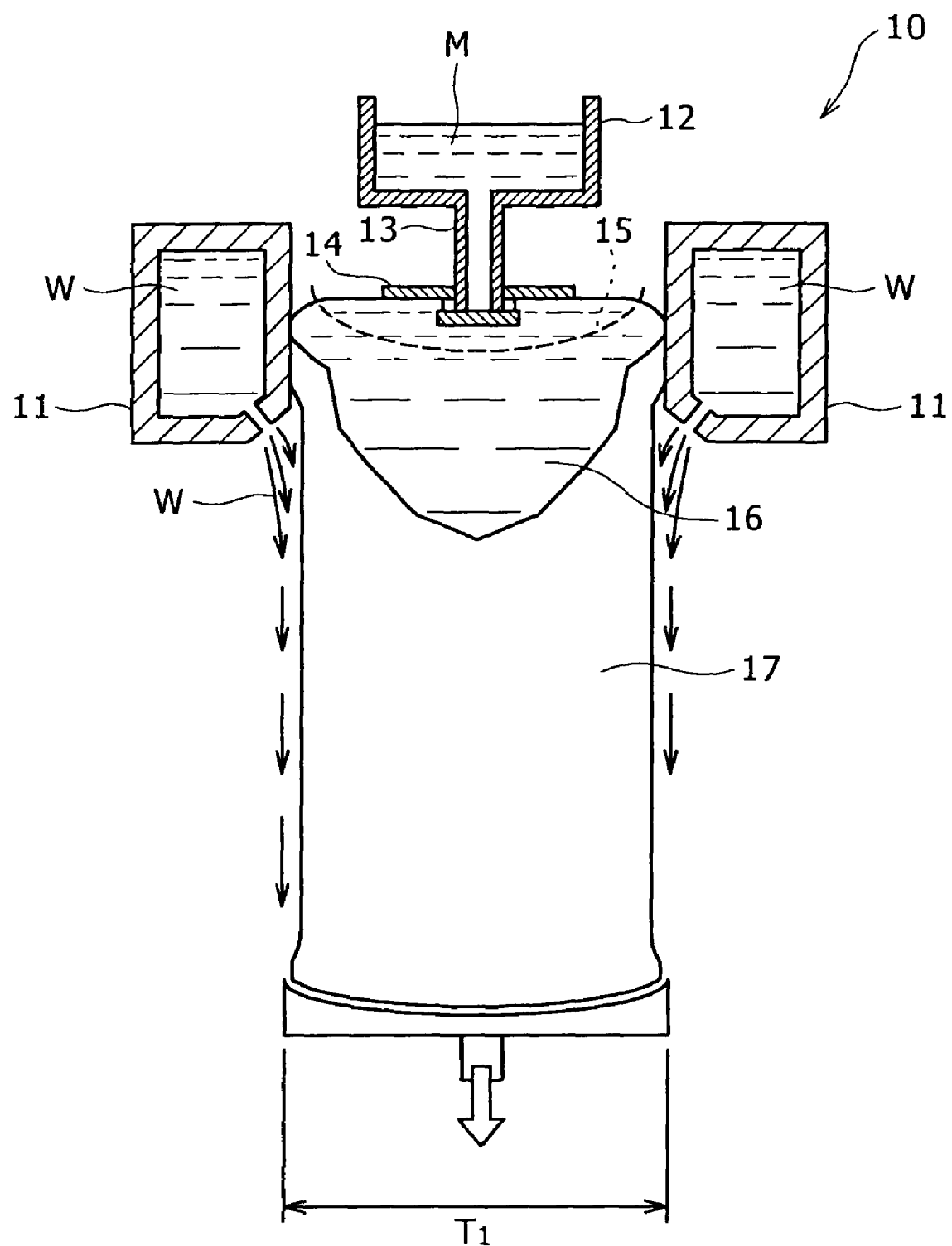
FIG. 4 is a schematic diagram illustrating the outlines of the core material preparation process or the skin material preparation process.

A casting apparatus 10 illustrated in FIG. 4 is adopted for the semi-continuous casting method, in which a molten metal M (herein, a metal for core material) is poured from the top into a metallic water-cooled casting mold 11 of which bottom is open, and a solidified metal is taken out continuously from the bottom of the water-cooled casting mold 11 to obtain an ingot 17 (herein, ingot for core material) having a predetermined thickness T1. At the time, the molten metal M is supplied to the water-cooled casting mold 11 via a tub 12, a nozzle 13, a float 14, and a glass screen 15. The molten metal M supplied to the water-cooled casting mold 11 is solidified by contacting the inner wall of the water-cooled casting mold 11, which is cooled by the cooling water W, and becomes a solidified shell 16. The ingot 17 (ingot for core material) can be manufactured continuously further with the cooling water W directly being jetted on the surface of the solidified shell 16 from bottom of the water-cooled casting mold 11.

Herein, the thickness T1 of the ingot for core material is preferably in the range of 200 to 700 mm. If the thickness T1 is outside the range, the clad rate of a clad material is apt to be inappropriate. In addition, at least one of a scalping treatment (described as "scalping" in FIGS. 1(a) and 1(b)) for removing a crystallized matter and an oxide formed on the surface of the ingot, and a heat treatment for homogenization (described as "homogenization heat" in FIGS. 1(a) and 1(b)), may be performed by a grinder before the ingot for skin material (described later) is superposed on the ingot for core material, appropriately as necessary.

By performing the scalping treatment, a core material can be obtained in which the flatness thereof is equal to or less than 1 mm per 1 m in the lengthwise direction, desirably equal to or less than 0.5 mm, in evaluation of flatness, and the surface roughness thereof is in the range of 0.05 to 1.5 μm, desirably 0.1 to 0.7 μm, in terms of the arithmetic mean roughness (Ra). When the flatness is beyond the range, the deterioration in adhesion is apt to occur in a clad material. When the surface roughness is below the range, the clad material has the difficulty in the processing. When the surface roughness is beyond the range, the deterioration in adhesion is apt to occur in the clad material. By performing the heat treatment for homogenization, the internal stress of the ingot for core material is removed, leading to an improved flatness of the core material. Herein, a temperature and a period of the heat treatment for homogenization are not particularly limited; however, the treatment temperature is preferably in the range of 350 to 600° C. and the treatment period is preferably in the range of 1 to 10 hours.

When the treatment temperature of the heat treatment for homogenization is below 350° C., the inner stress is less removed and the homogenization of a solute element, which is segregated during casting, is insufficient, therefore the effect of the heat treatment which is dared to be performed is small. On the other hand, when the treatment temperature is beyond 600° C., a phenomenon called burning occurs, in which part of the surfaces of the ingot is dissolved, which is apt to be a cause of a defect on the surface of the clad material. When the treatment period is below 1 hour, the effect of removal of the inner stress is small, and the homogenization is apt to be insufficient. The treatment period is preferable to be equal to or less than 10 hours in view of productivity.

(2) Skin Material Preparation Process: S1b

Figure 5:
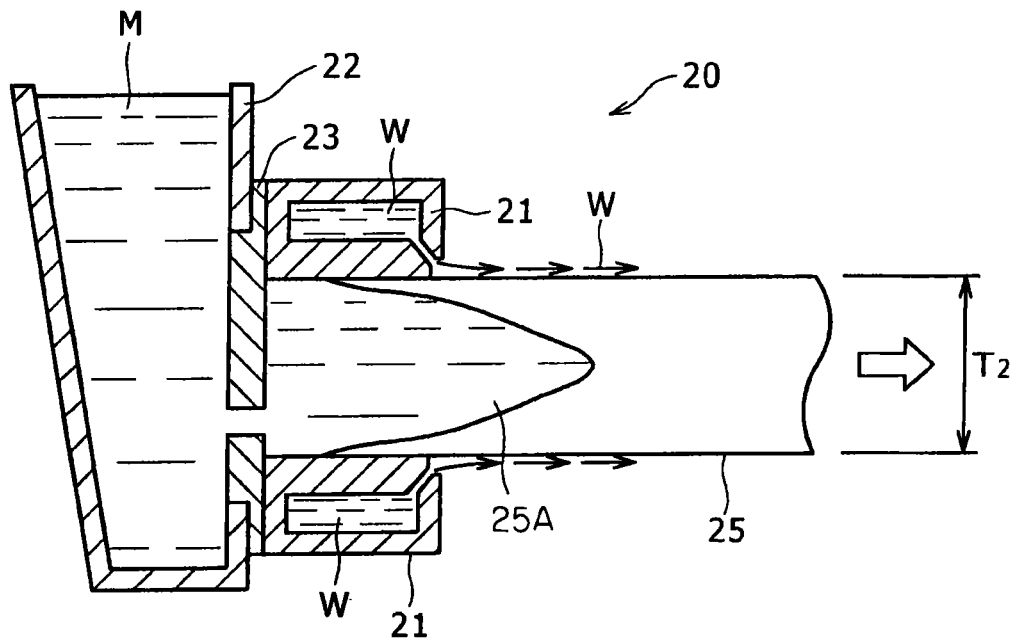
FIG. 5 is a schematic diagram illustrating the outlines of the core material preparation process or the skin material preparation process.
Figure 6:
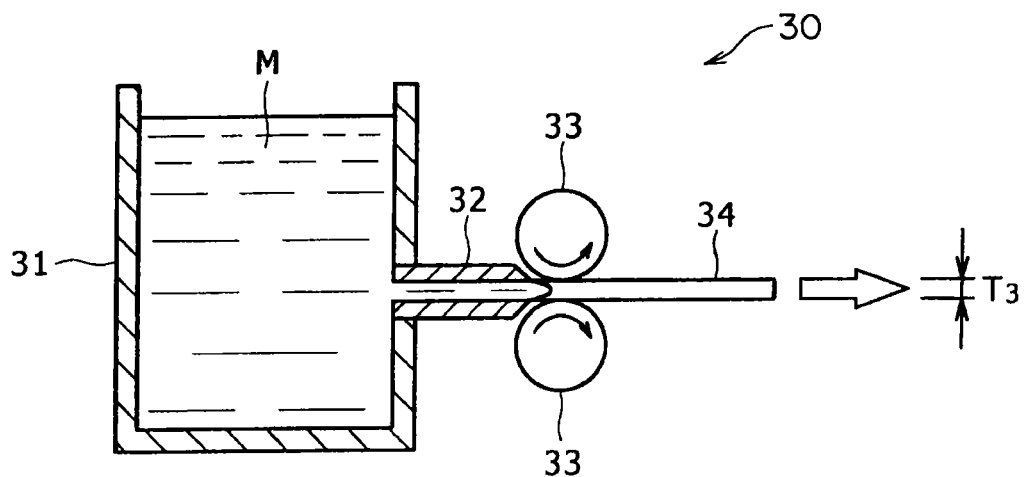
FIG. 6 is a schematic diagram illustrating the outlines of the core material preparation process or the skin material preparation process.

In the skin material preparation process S1b, a metal for skin material, which is different from the metal for core material in their component compositions, is dissolved and cast so that one or more ingots for skin material are manufactured. The ingot for skin material manufactured herein is in some cases superposed as a skin material as it is, at a predetermined position on either of one or both faces of the ingot for core material, or in other cases, an ingot for skin material manufactured by slicing the ingot for skin material is superposed as a skin material at a predetermined position on either one or both faces of the ingot for core metal. Herein, the metal for skin material is a metal having the above component composition. As for a casting method, the thin slab casting method or the twin-roll casting method illustrated in FIG. 5 and FIG. 6 is preferable, and as for a slicing method, the slab slice method illustrated in FIGS. 7(a) and 7(b) is preferable. However, a casting method is not limited to the thin slab casting method or the twin-roll casting method, for example, the semi-continuous casting method may be used. The width and the length of the ingot for skin material are not particularly limited; however, the width is preferably in the range of 1000 to 2500 mm, and the length is preferably in the range of 3000 to 10000 mm. Hereinafter, the thin slab casting method, the twin-roll casting method, and the slab slice method will be explained.

(Thin Slab Casting Method)

A casting apparatus 20 illustrated in FIG. 5 is adopted for the thin slab casting method, in which a molten metal M (herein, a metal for skin material) is poured from the side direction into a metallic water-cooled casting mold 21 of which side portion is open, and a solidified metal is taken out continuously from the side portion of the water-cooled casting mold 21 to obtain an ingot 25 (herein, ingot for skin material) having a predetermined thickness. At the time, the molten metal M is supplied to the water-cooled casting mold 21, which is connected via a refractory 23, from a tub 22. The molten metal M supplied to the water-cooled casting mold 21 is solidified by contacting the inner wall of the water-cooled casting mold 21, which is cooled by the cooling water W, and becomes a solidified shell 25A. The ingot 25 (ingot for core material) can be manufactured continuously further with the cooling water W directly being jetted on the surface of the solidified shell 25A from the side portion of the water-cooled casting mold 21. Herein, the thickness T2 of the ingot for skin material is preferably in the range of 3 to 200 mm. When the thickness T2 is outside the range, the clad rate of the clad material is apt to be inappropriate. In FIG. 5, the casting apparatus 20 of which casting direction is horizontal is illustrated, however, a vertical-type casting apparatus of which casting direction is vertical may be adopted.

(Twin-roll Casting Method)

As illustrated in FIG. 6, the twin-roll casting method is a casting method using rolls facing each other as rotating casting molds, and in the method, a casting apparatus 30 including a pair of rolls 33 and 33, a side dam 31 installed between the pair of rolls 33 and 33, and a cooling device (not illustrated, however, generally installed within the rolls 33 and 33) which cools the rolls 33 and 33, is adopted. A molten metal M (herein, a metal for skin material) is supplied to a gap between the outer peripheral surfaces of the rotating rolls 33 and 33 from a nozzle 32 at a side portion of the side dam 31, and an ingot 34 (herein, ingot for skin material) having a predetermined thickness T3 can be continuously manufactured by cooling the rolls 33 and 33 with the use of the cooling device soon after supplying the molten metal M. Herein, the thickness T3 of the ingot for core material is preferably in the range of 3 to 200 mm. If the thickness T3 is outside the range, the clad rate of the clad material is apt to be inappropriate. In FIG. 6, the horizontal-type casting apparatus 30 of which casting direction is horizontal is illustrated, however, a vertical-type casting apparatus of which casting direction is vertical may be adopted. In addition, as a rotating casting mold, a casting apparatus using a belt or a block may be adopted.

(Slab Slice Method)

As illustrated in FIG. 7, the slab slice method slices, in the slice process of the skin material preparation process S1b, the ingot 17 (25) manufactured by the semi-continuous casting method or the thin slab casting method, by a band saw cutting apparatus (not illustrated) to obtain an ingot for skin material 35 having a predetermined thickness T4. The ingot for skin material 35 manufactured by slicing becomes a skin material. Herein, the thickness T4 of the ingot for skin material 35 is preferably in the range of 3 to 200 mm. When the thickness T4 is outside the range, the clad rate of the clad material is apt to be inappropriate. As illustrated in FIG. 7(b), the ingot 17 (25), which is installed horizontally, is preferably sliced in parallel to the installation face 35a of the ingot 17 (25). Herein, the installation face 35a means the face of the ingot for skin material 17 (25) which is in contact with the installation stand of the slicing machine. By slicing the ingot in this way, the influence by the weight of a cut lump (slice lump) or the displacement by a shape (for example, the force produced when the cut lump is falling down, etc.), is minimized, therefore, the flatness of a sliced skin material can be improved. As for a slicing method, the ingot may be sliced by a circular saw cutting apparatus, or with the use of laser or water.

As illustrated in FIG. 1 (C), the ingot 17 (25) manufactured by the above casting method may be subjected to a heat treatment for homogenization (described as "homogenization heat" in FIG. 1 (C)), prior to the ingot being sliced, appropriately as necessary. By performing a heat treatment for homogenization, the internal stress of ingot 17 (25) is removed and the flatness of the sliced skin material is more improved. The temperature and the period of the heat treatment for homogenization are not particularly limited; however, the treatment temperature is preferably in the range of 350 to 600° C. and the treatment period is preferably in the range of 1 to 10 hours.

When the treatment temperature of the heat treatment for homogenization is below 350° C., the inner stress is less removed and the homogenization of a solute element, which is segregated during casting, is insufficient, therefore the effect of the heat treatment which is dared to be performed is small. On the other hand, when the treatment temperature is beyond 600° C., a phenomenon called burning occurs, in which part of the surfaces of the ingot is dissolved, which is apt to be a cause of a defect on the surface of a clad for an heat exchanger. When the treatment period is below 1 hour, the effect of removal of the inner stress is small, and the homogenization is apt to be insufficient. The treatment period is preferable to be equal to or less than 10 hours in view of productivity.

The ingot for skin material manufactured by the above methods may be subjected to at least one of a scalping treatment (described as "scalping" in FIGS. 1(a), 7(b), and 7(c)) for removing a crystallized matter and an oxide formed on the surface of the ingot, and a heat treatment for homogenization (described as "homogenization heat" in FIGS. 1(a), 1(b), and 1(c)), by a grinder, before the ingot for skin material is m superposed on the ingot for core material described above, appropriately as necessary. By performing slicing and the scalping treatment in such a way, an ingot for skin material can be obtained in which the flatness thereof is equal to or less than 1 mm per 1 m in the lengthwise direction, desirably equal to or less than 0.5 mm, in evaluation of flatness, and the surface roughness thereof is in the range of 0.05 to 1.5 µm, desirably 0.1 to 1.0 µm, in terms of the arithmetic mean roughness (Ra). When the flatness is beyond the range, the deterioration in adhesion is apt to occur in a clad material. When the surface roughness is below the range, the clad material has the difficulty in the processability. When the surface roughness is beyond the range, the deterioration in adhesion is apt to occur in the clad material. By performing the heat treatment for homogenization, are not particularly limited; however, the treatment temperature is preferably in the range of 350 to 600° C., and the treatment period is preferably in the range of 1 to 10 hours.

When the treatment temperature of the heat treatment for homogenization is below 350° C., the inner stress is less removed and the homogenization of a solute element, which is segregated during casting, is insufficient, therefore the effect of the heat treatment which is dared to be performed is small. On the other hand, when the treatment temperature is beyond 600° C., a phenomenon called burning occurs, in which part of the surfaces of the ingot is dissolved, which is apt to be a cause of a defect on the surface of the clad material. When the treatment period is below 1 hour, the effect of removal of the inner stress is small, and the homogenization is apt to be insufficient. The treatment period is preferable to be equal to or less than 10 hours in view of productivity.

As for surface smoothing treatment, a cutting method, such as an end mill cutting, a diamond bite cutting; a grinding method which faces a surface by a grind rocks or the like; and a polishing method such as a buffing, or the like, can be adopted; however, methods for surface smoothing treatment are not limited thereto.

By using such a skin material 35, a clad material for a heat exchanger can be obtained in which the corrosion depth thereof after the following examination, is equal to or less than 60 µm, the examinations being: 1500-hour CASS examination (neutral salt spray test: JIS Z 2371) as an examination for evaluating the outside corrosion resistance, and 2000-hour immersion examination ($Na^+$: 118 ppm, $Cl^-$: 58 ppm, $SO_4^{2-}$: 60 ppm, $Cu^{2+}$: 1 ppm, $Fe^{3+}$: 30 ppm) at 80° C. as an examination for evaluating the inside corrosion resistance.

It may be possible that at least one layer of the skin material 35 is manufactured by the above manufacturing method, and other layer (layers) is manufactured by a conventional method.

(3) Superposition Process: S2a

As illustrated in FIG. 8(a), in the superposition process S2a, a superposed material 36 is manufactured by superposing one ingot for skin material 25, 34, and 35 (17), or two or more ingots for skin material (not illustrated), are superposed at a predetermined position on either of one or both faces (not illustrated) of the ingot for core material 17 (25, 34, and 35) manufactured in the above process. Herein, the predetermined position means that the position corresponds to an arrangement of the core material and the skin material in the clad material as a product, for example, the arrangement of the core material 2 and the skin material 3 in the clad materials 1a, 1b, and 1c, illustrated in FIGS. 3(a)-3(c). As for a method for superposition, a known method, for example, a method in which the both end portions of the ingot for core material 17 (25, 34, and 35) and the ingot for skin material 25, 34, and 35 (17), are strapped with a band 37, is adopted. Other methods, for example, fixation by welding may be adopted.

(4) Clad Hot-rolling Process: S3

As illustrated in FIG. 8(b), a clad material 1a, in the clad hot-rolling process S3, is manufactured with the superposed material 36 being hot-rolled after the band 37 of the superposed material 36 has been cut. Herein, a known rolling method is adopted as a hot-rolling method. A four-roller rolling machine is illustrated as a rolling machine to be used, in FIG. 8(b); however, a two-roller rolling machine or a rolling machine having four or more rollers, which are not illustrated, may be used. To obtain a clad material 1a having a predetermined thickness, a rolling apparatus 40 provided with a single column of a roll stand is illustrated in FIG. 8(b); however, a rolling apparatus provided with multiple columns of roll stands, which is not illustrated, may be used to repeat executions of hot-rolling.

A clad material manufactured in such a way may be subsequently subjected to a cold-rolling process, a heat treatment (annealing process), a distortion correction process, or an aging treatment or the like with the use of common methods in order to provide a desired mechanical property or the like, or may be processed to a certain shape, or may be cut into a certain size, as necessary. As an example for that, a cold-rolling process is performed on condition that a rolling reduction rate is in the range of 30 to 99%; an intermediate annealing process, which is preformed between cold-rolling processes, is performed as an annealing process; and a final annealing process, which is performed after the final cold-rolling process, is performed in a continuous furnace or a batch furnace at 200 to 500° C. for 0 to 10 hours, can be cited; however, such a treatment or a process is not limited thereto, and such processes or treatments may be performed with the conditions being changed appropriately, as long as the processes or treatments provide an effect (mechanical property).

2. Second Embodiment

Figure 2:
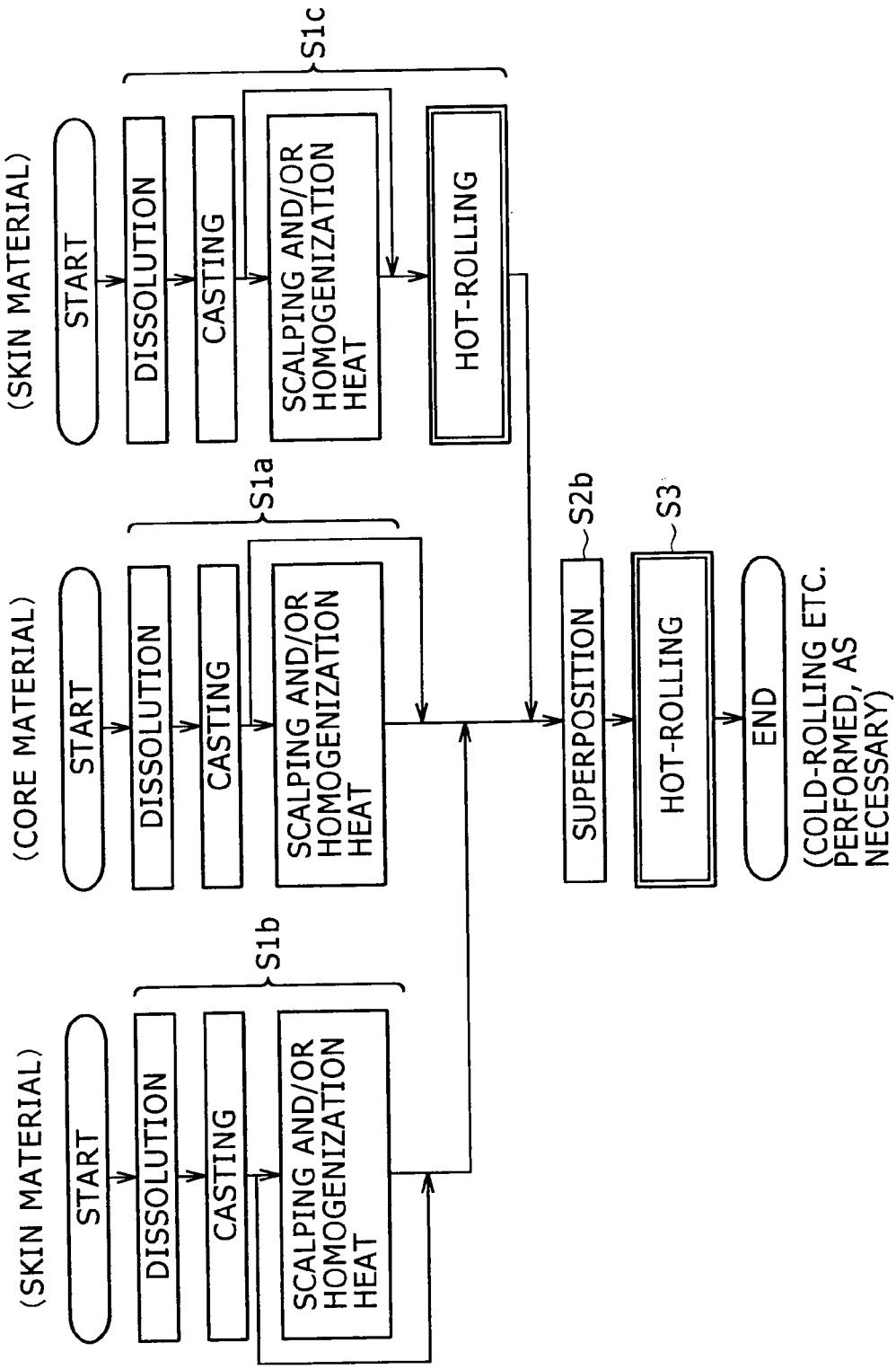
FIG. 2 is a diagram illustrating a flow of a method for manufacturing a clad material according to the second embodiment of the present invention.

Next, a second embodiment of the method for manufacturing a clad material of the present invention will be explained below. The method for manufacturing a clad material according to Second Embodiment is a method for manufacturing a clad material composed of a core material and two or more skin materials that are superposed on either one or both faces of the core material, and, for example, the clad material 1d, in which the skin material 3 is superposed on one face of the core material 2 and the skin material 4 on the other face thereof, as illustrated in FIG. 3(d), is manufactured by the method. As illustrated in FIG. 2, the method for manufacturing a clad material according to Second Embodiment includes: the clad material preparation process composed of the core material preparation process S1a, the skin material preparation process S1b, and the skin material rolling process S1c; the superposition process S2b; and the clad hot-rolling process S3. Herein, the skin material 3 in the clad material which has been clad, is formed from the ingot for skin material manufactured in the skin material preparation process S1b, via the next processes (the superposition process S2 and the clad hot-rolling process S3), and the skin material 4 is formed from the rolled plate for skin material manufactured in the skin material rolling process S1c, via the next processes. Because the core material preparation process S1a, the skin material preparation process S1b, and the clad hot-rolling process S3 are the same as in the above First Embodiment, the explanation will be omitted, therefore the skin material hot-rolling process S1c and the superposition process S2b will be explained below.

[Preparation Process]

The preparation process is a process in which the ingot for core material manufactured in the core material preparation process S1a, the ingot for skin material manufactured in the skin material preparation process S1b, and the rolled plate for skin material manufactured in the skin material rolling process S1c, are prepared. In the preparation process, any one of the ingot for core material, the ingot for skin material, and the rolled plate for skin material, may be at first manufactured and prepared, and two or three processes of the core material preparation process S1a, the skin material preparation process S1b, and the skin material rolling process S1c, may be advanced and prepared at a same time.

(Skin Material Rolling Process: S1c)

In the skin material rolling process, a metal for skin material, which is different from a metal for core material in their component compositions, is dissolved and cast so that the ingot for skin material is manufactured, and the ingot for skin material is further hot-rolled so that one or more rolled plates for skin material are manufactured. It should be noted that the skin material in this process is the metal having the aforementioned component composition. As for a casting method, the semi-continuous casting method and the thin slab casting method, which are described before, are preferable. In addition, the ingot for skin material may be subjected to at least one of a scalping treatment and a heat treatment for homogenization (described as scalping and homogenization heat, respectively, in FIG. 2). As for a hot-rolling method, a known rolling method is performed in the same way as the clad hot-rolling process. A rolling machine to be used is the same as that of the clad hot-rolling process. The thickness of the rolled plate for skin material is preferably in the range of 3 to 200 mm, and when the thickness is outside the range, the clad rate of the clad material is apt to be inappropriate.

(Superposition Process: S2b)

In the superposition process S2b (not illustrated), a superposed material is manufactured in which one or more ingots for skin material and a rolled plate for skin material manufactured in the previous process are superposed at a predetermined position on either one or both faces of the ingot for core material manufactured in the previous process. Herein, the predetermined positions means that the positions correspond to the arrangement of a clad material as a product, for example, the arrangement of the core material 2, the skin material 3, and the skin material 4, in the clad material 1d illustrated in FIG. 3(d). Alternatively, an arrangement in which the skin material 3 and the skin material 4 are superposed on one face of the core material 2, may be possible. As for a method for superposition, a known method, for example, a method in which the both end portions of the ingot for core material, the ingot for skin material, and the rolled plate for skin material, are strapped with a band, or a method for fixation by welding, may be adopted.

It is preferable that each gap formed when superposing them is equal to or less than 10 mm at the maximum, desirably equal to or less than 5 mm.

A clad material manufactured in such a way may be subsequently subjected to a cold-rolling process, a heat treatment (annealing process), a distortion correction process, or an aging treatment or the like with the use of common methods in order to provide a desired mechanical property or the like, or may be processed to a certain shape, or may be cut into a certain size, as necessary, in the same way as First Embodiment.

3. Third Embodiment

Third Embodiment of the method for manufacturing a clad material of the present invention will be described below. In the drawings referred to, FIGS. 9(a) and 9(b) are diagrams illustrating flows of methods for manufacturing a clad material for heat exchangers, and FIG. 10 are cross-sectional diagrams illustrating structures of a clad material for heat exchangers.

Figure 9A:
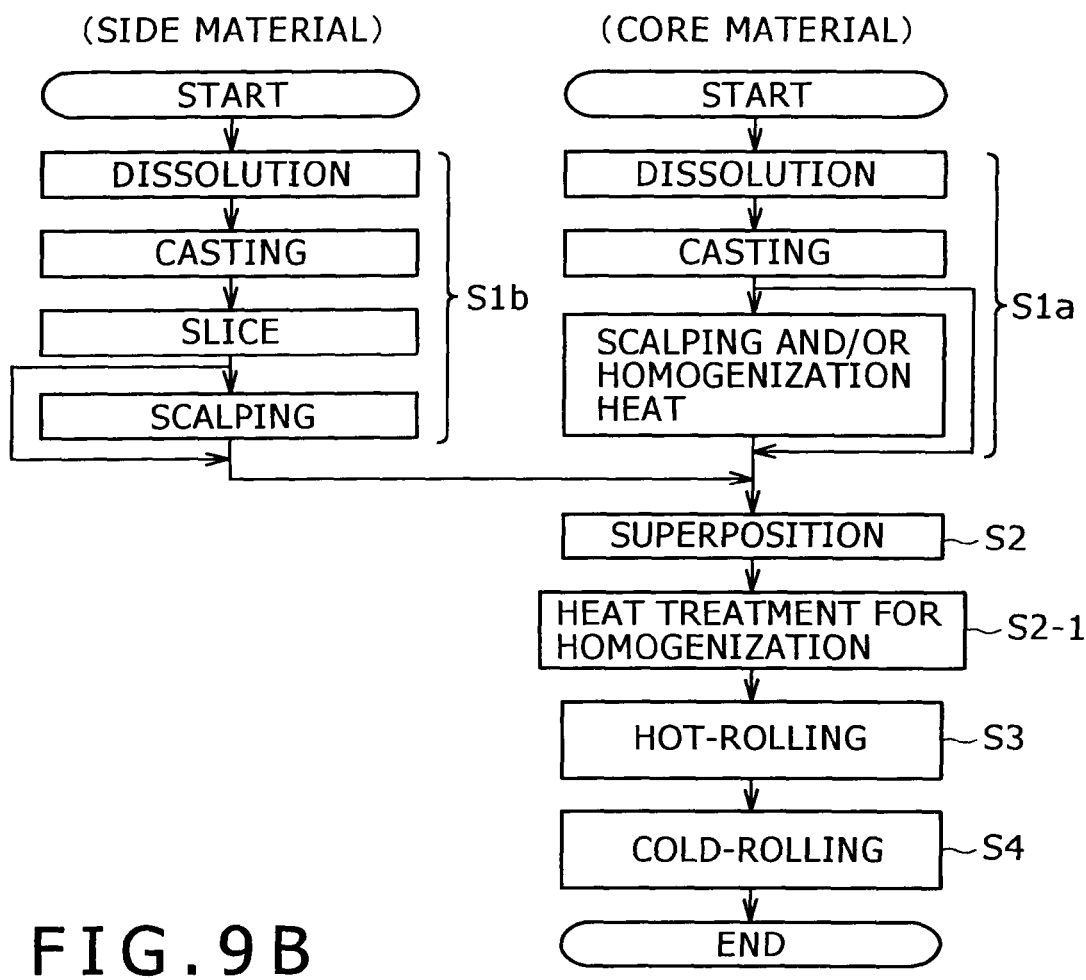
FIGS. 9($a$) and 9($b$) are diagrams illustrating flows of methods for manufacturing the clad material for heat exchangers according to the third embodiment of the present invention.
Figure 9B:
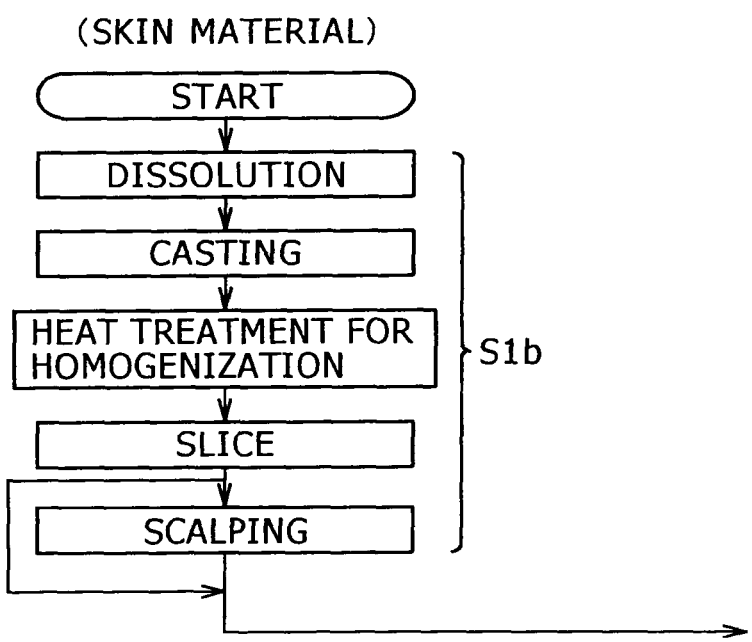

As illustrated in FIGS. 9(a) and 9(b), in the method for manufacturing a clad material for heat exchanger according to the present invention, the core material and the skin material, which is superposed on the core material, are manufactured by the core material manufacturing process S1a which is a core material preparation process, and by the skin material manufacturing process S1b which is a skin material. Subsequently, a superposed material is manufactured by superposing the skin material on the core material at a predetermined position in the superposition process S2, then the superposed material being subjected to a heat treatment for homogenization in the heat treatment process for homogenization S2-1. After the heat treatment process for homogenization S2-1, a hot-rolling treatment is performed in the hot-rolling process S3, and further a cold-rolling process is performed in the cold-rolling process S4.

Either of the skin material or the core material may be manufactured and prepared at first, or the core material manufacturing process S1a and the skin material manufacturing process S1b may be advanced and prepared at a same time.

When the clad material is a clad material for heat exchangers, each layer of the skin material is classified into a filler material 7, a sacrificial material 8, and an intermediate material 9, according to the functions thereof. At first, a typical structure of a clad for heat exchangers will be described below.

Figure 10A:
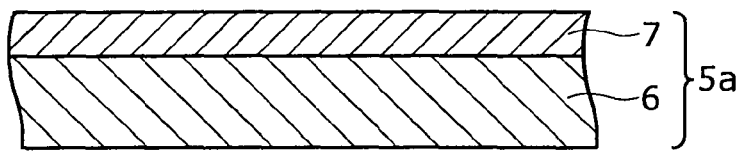
FIGS. 10($a$)-10($f$) are cross-sectional diagrams illustrating structures of the clad material for heat exchangers according to the third embodiment of the present invention.
Figure 10B:
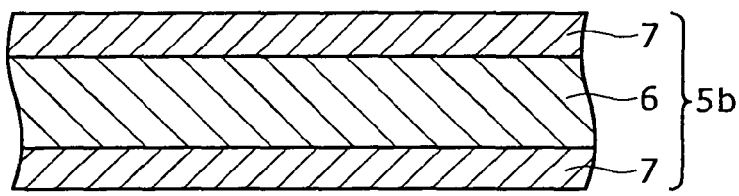
Figure 10C:
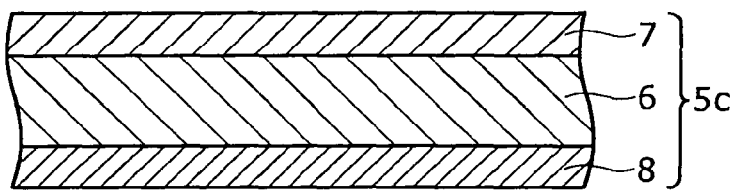
Figure 10D:
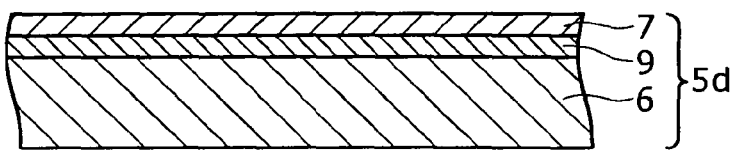
Figure 10E:
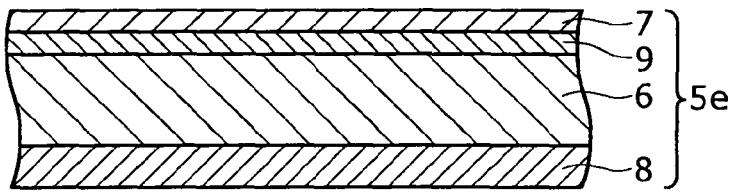
Figure 10F:
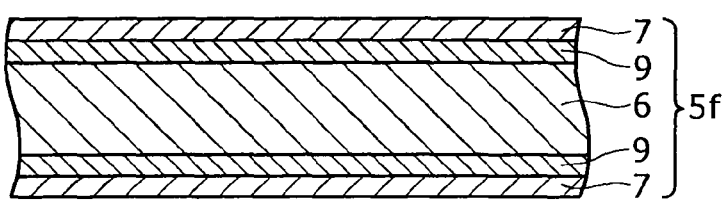

A skin material is used for a clad material for heat exchangers in which one or more layers of the skin material are superposed on either one or both faces of the core material, and the number of the layers of the skin material in the clad material for heat exchangers is not limited at all. Examples of layers of the skin material can be exemplified as follows: for example, as illustrated in FIG. 10(a), a two-layer clad material 5a for heat exchangers in which one filler material 7 is clad on the core material 6; as illustrated in FIG. 10(b), a three-layer clad material 5b for heat exchangers in which each filler material 7 is clad on both faces of the core material 6; as illustrated in FIG. 10(c), a three-layer clad material 5c for heat exchangers in which the filler material 7 is clad on a face of a core material 6 and the sacrificial material 8 is on the other face thereof; as illustrated in FIG. 10(d), a three-layer clad material 5d for heat exchangers in which the intermediate material 9 and the filler material 7 are clad on one face of the core material 6; as illustrated in FIG. 10(e), a four-layer clad material 5e for heat exchangers in which the intermediate material 9 and the filler material 7 are clad on one face of the core material 6, and the sacrificial material 8 is on the other face thereof; as illustrated in FIG. 10(f), a five-layer clad material for heat exchanger in which the intermediate materials 9 and the filler materials 7 are clad on both faces of the core material 6. However, needless to say, a six or more-layer clad material for heat exchangers (not illustrated) in which the number of layers of the skin material (filler material, sacrificial material, and intermediate material) is further increased, can be preferably adopted.

Each layer of skin material according to the present invention is composed of a metal for skin material which is different from a core material in their component compositions. Examples of metals for skin material include, for example, an aluminum alloy, a copper alloy, and a steel alloy or the like. It is preferable that the above skin materials are made of a 1000-series aluminum alloy in accordance with the JIS standard, or of various aluminum alloys outside the JIS standard. Examples of aluminum alloys outside the JIS standard applicable to the above skin materials include an Al—Mn system, an Al—Mn—Cu system, an Al—Mn—Si system, an Al—Mn—Cu—Si system, an Al—Mn—Mg system, an Al—Mn—Mg—Cu system, an Al—Mn—Mg—Si system, an Al—Mn—Mg—Cu—Si system, an Al—Zn system, an Al—Mg—Zn system, an Al—Si—Zn system, an Al—Si—Mn—Zn system, an Al—Si—Mg—Zn system, an Al—Si—Mn—Mg—Zn system, an Al—Mn—Zn system, an Al—Mn—Si—Zn system, an Al-3-10Si alloy, an Al-3-10 Si—Zn alloy, etc. Such aluminum alloys may further contain 0.05-0.3% of Sc, 0.05-0.3% of Zr, 0.05-0.3% of Ti, or 0.001-0.1 of Sr.

In the case where the filler material 7 and the sacrificial material 8 are used, the filler material 7 and the sacrificial material 8 are placed on the side of the most outer surface of each face of the core material, respectively.

[Skin Material Preparation Process]

In the skin material preparation process S1b, one or more layers of the skin material, which are to be superposed on either one or both faces of the core material used in a clad material for heat exchangers, are manufactured, as illustrated in FIG. 9. The skin material preparation process S1b includes a dissolution process where the metal for skin material, which is different from the core material in their component compositions, is dissolved; a casting process where the metal for skin material dissolved in the dissolution process, is cast and made into the ingot for skin material; and a slice process where the ingot for skin material is sliced into a predetermined thickness to be at least one layer of the skin material. A heat treatment for homogenization (described later) may be performed after the casting process, as necessary, and a surface smoothing treatment (scalping in FIG. 9), which is described later, may be performed after the slice process.

(Dissolution Process)

In the dissolution process, the metal for skin material different from the core material in their component compositions is dissolved. When the clad materials 5a to 5f for heat exchangers are provided with the filler material 7 as the metal for skin material, a 4000-series Al—Si system aluminum alloy can be adopted as the filler material. Herein, the Al—Si system alloy includes an alloy also containing Zn other than Si. As Al—Si system alloys, an Al-7-13 Si (mass %) system alloy, and Al-7-13 Si (mass %)-2-7 Zn (mass %) system alloy or the like can be adopted, for example. However, the Al—Si system alloys are not limited thereto, and any alloy used as a filler material can be adopted.

When the clad materials 5c and 5e for heat exchangers are provided with the sacrificial material 8 as the skin material, a 3000-series Al—Mn system aluminum alloy or a 7000-series Al—Zn—Mg system aluminum alloy, and further an Al—Zn system alloy can be adopted as the sacrificial material. Herein, the Al—Zn system alloy includes an alloy also containing Mn and Si other than Zn. As Al—Zn system alloys, an Al-1-7 Zn (mass%), an Al-0.5-1.2 Mn (mass%)-0.5-1.2 Si (mass%)-2-6 Zn (mass%) system alloy, Al-0.8-1.2 Si (mass%)-2-6 Zn (mass%) system alloy, can be adopted. However, the Al—Zn system alloys are not limited thereto, and any alloy used as the sacrificial material can be adopted.

When the clad materials 5d to 5f for heat exchanger are provided with the intermediate material 9 as the metal for skin material, a 1000-series pure aluminum, or a 7000-series Al—Zn—Mg system aluminum alloy or the like can be adopted as the intermediate material, and further an Al—Mn system alloy can also be adopted. Herein, the Al—Mn system alloy includes an alloy also containing Cu, Si, and Ti, other than Mn. As an Al—Mn system alloys, an Al-0.5-1.2 Mn (mass %)-0.5-1.2 Cu Si (mass %) system alloy and an Al-0.5-1.2 Mn Cu (mass %)-0.5-1.2 Si (mass %)-0.05-0.3 Ti (mass %) can be adopted. However, the Al—Mn system alloys are not limited thereto, and any alloy used as an intermediate material can be adopted. Adjustment of the component compositions in the above metals can be appropriately determined in accordance with an application or the like of the clad material to be used.

The intermediate material 9 is provided in order to prevent corrosion of the filler material 7 into the core material 6 from occurring, for example, when brazing the clad material.

(Casting Process)

Explanation of the casting process will be omitted since the process thereof is the same as described in First Embodiment.

(Slice Process)

Explanation of the slice process will be omitted since the process thereof is the same as described in First Embodiment.

[Core Material Preparation Process]

As illustrated in FIG. 9, the core material preparation process S1a includes a dissolution process where a metal for core material is dissolved; and a casting process where an ingot for core material is manufactured by casting the metal for core material dissolved in the dissolution process. At least one of a surface smoothing treatment (scalping in FIG. 1) and a heat treatment for homogenization, may be performed. Herein, explanation of each process thereof will be omitted since the process thereof is the same as described in First Embodiment.

[Superposition Process]

Herein, explanation of the superposition process will be omitted since the process thereof is the same as described in First Embodiment.

[Heat Treatment for Homogenization Process]

The superposed material 36 manufactured in the superposition process S2 is subjected to a heat treatment for homogenization in order to make the inner structure thereof homogenized and soften the superposed material for performing the hot-rolling effectively (S2-1).

[Hot-rolling Process]

Herein, explanation of the hot-rolling process S3 will be omitted since the process thereof is the same as described in First Embodiment.

[Cold-rolling Process]

Herein, explanation of the cold-rolling process S4 will be omitted since the process thereof is the same as described in First Embodiment.

As mentioned above, according to the method for manufacturing a clad material according to the present invention, the flatness and the smoothness of the skin material can be improved because the surface state and the flatness of the skin material can be readily controlled, further leading to the reduction in the thickness of an oxide film. Because of the improved adhesion property and the improved press-bonding property, the number of passes of pressure-bonding can be reduced, leading to an improved yield rate and an improved productivity. Moreover, a gap between the core material and each skin material is rarely formed, leading to the improved corrosion resistance.

4. Fourth Embodiment

Explanation of the method for manufacturing a clad material according to Fourth Embodiment will be omitted because the method is the same as that for manufacturing a clad material of the above Second Embodiment except that at least one layer of the skin material has a casting structure.

Each layer of the skin material according to the present invention is composed of a metal for skin material different from the core material in their component compositions. As the metal for skin material, for example, an aluminum alloy, a copper alloy, and a steel alloy or the like can be cited, and a 1000-series, a 3000-series, a 4000-series, or a 7000-series aluminum alloy in accordance with the JIS standard can be preferably cited.

Figure 11:
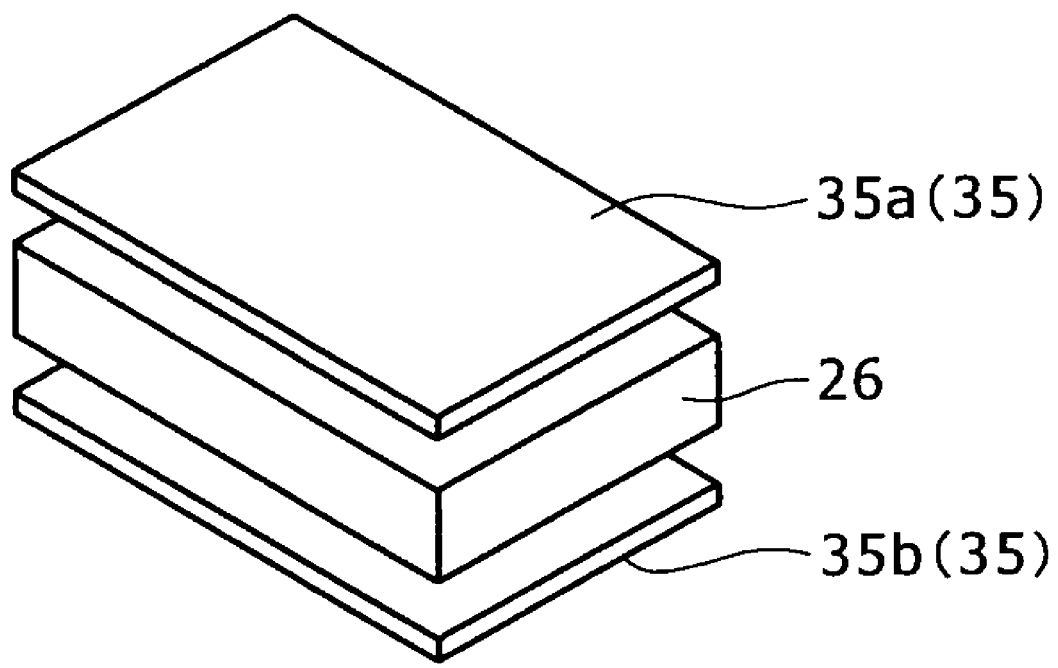
FIG. 11 is a perspective view of the clad material according to the present invention.

As illustrated in FIG. 11, at least one layer (skin material 35) of the skin material 35 is required to have a casting structure, when superposing the skin material on either one (not shown) or both faces of the core material 26, which has a casting structure, in manufacturing a clad material. Herein, the core material 26 is made by cutting the ingot for core material 17 illustrated in FIG. 4 so as to have a predetermined length. Because at least one layer (skin material 35a) of the skin material 35 has a casting structure, the adhesion property between the core material 26 and the skin material 35a is improved. Therefore, the press-bonding property between them is improved in the hot-rolling process of both materials (see FIG. 8(b)), and the number of passes of press-bonding is reduced, leading to an improved yield rate and an improved productivity. Moreover, a clad material excellent in the corrosion resistance can be obtained. In FIG. 11, an example is illustrated in which each one layer of the skin material 35 is superposed on both faces of the core material 26, respectively. When multiple layers of the skin material 35 are superposed on either one or both faces of the core material 26, a layer having a casting structure (skin material) may be a layer next to the core material 26 or next to the skin material 35. However, in view of the adhesion property and the press-bonding property between the core material 26 and the skin material 35, it is preferable that the layer of the skin material next to the core material 26 has a casting structure.

In the skin material 35 according to the present invention, it is preferable that the layers (skin material 35 b) of the skin material other than the layer having a casting structure (skin material 35a), are composed of layers having a casting structure, to improve the adhesion property between the core material 26 and the skin material 35 or between the layers (not shown) of the skin material 35; however, the layers of the skin material may be composed of a layer having a rolling texture, which is manufactured by hot-rolling and used as a skin material for a conventional clad material. The thickness (T4 in FIG. 7) of a layer (skin material 35a) having a casting structure is preferably in the range of 10 to 250 mm. When the thickness is outside the range, the clad rate of a clad material is apt to be inappropriate.

It is preferable that the skin material 35 according to the present invention has a layer (skin material 35a) having a casting structure and the surface roughness of the skin material 35 is in the range of 0.05 to 1.0 μm, desirably 0.1 to 0.7 μm in terms of the arithmetic mean roughness (Ra). When the surface roughness is below the range, the skin material has the difficulty in the processing, adversely when the surface roughness is beyond the range, a fine gap between the core material 26 and the skin material 35a is formed, thereby the press-bonding property and the adhesion property are deteriorated, resulting in occurrence of the deterioration in adhesion in the clad material. It is preferable that the flatness of the layer (skin material 35a) having a casting structure is equal to or less than 1 mm per 1 m in the lengthwise direction of the layer, most preferably equal to or less than 0.5 mm. When the flatness is beyond the range, a fine gap between the core material 26 and each skin material 35 (not illustrated) is formed, thereby the press-bonding property and the adhesion property are deteriorated, resulting in occurrence of the deterioration in adhesion in the clad material.

By using such a skin material 35, the clad material can be manufactured in which the corrosion depth thereof after the following examination, is equal to or less than 60 μm, the examinations being: 1500-hour CASS examination (neutral salt spray test: JIS Z 2371) as an examination for evaluating the outside corrosion resistance, and 2000-hour immersion examination ($Na^+$: 118 ppm, $Cl^-$: 58 ppm, $SO_4^{2-}$: 60 ppm, $Cu^{2+}$: 1 ppm, $Fe^{3+}$: 30 ppm) at 80° C. as an examination for evaluating the inside corrosion resistance.

It is preferable that the layer (skin material 35b) other than the layer (skin material 35a) having a casting structure is also manufactured by the above manufacturing method; however, the layer may be manufactured by a known manufacturing method using a conventional dissolution, casting, scalping (heat for homogenization), and hot-rolling. The skin materials 35a and 35b may be manufactured with the use of the thin slab casting method or the twin-roll casting method instead of the slab slice method.

5. Embodiment of Equipment for Manufacturing Skin Material

The equipment for manufacturing a skin material will be described in detail below with reference to the accompanying drawings. In the drawings referred to, FIG. 12 is a schematic diagram illustrating the equipment for manufacturing skin materials 50, and FIG. 13 is a schematic diagram illustrating other equipment for manufacturing skin materials 50.

5.1. Equipment for Manufacturing Skin Material

Figure 12:
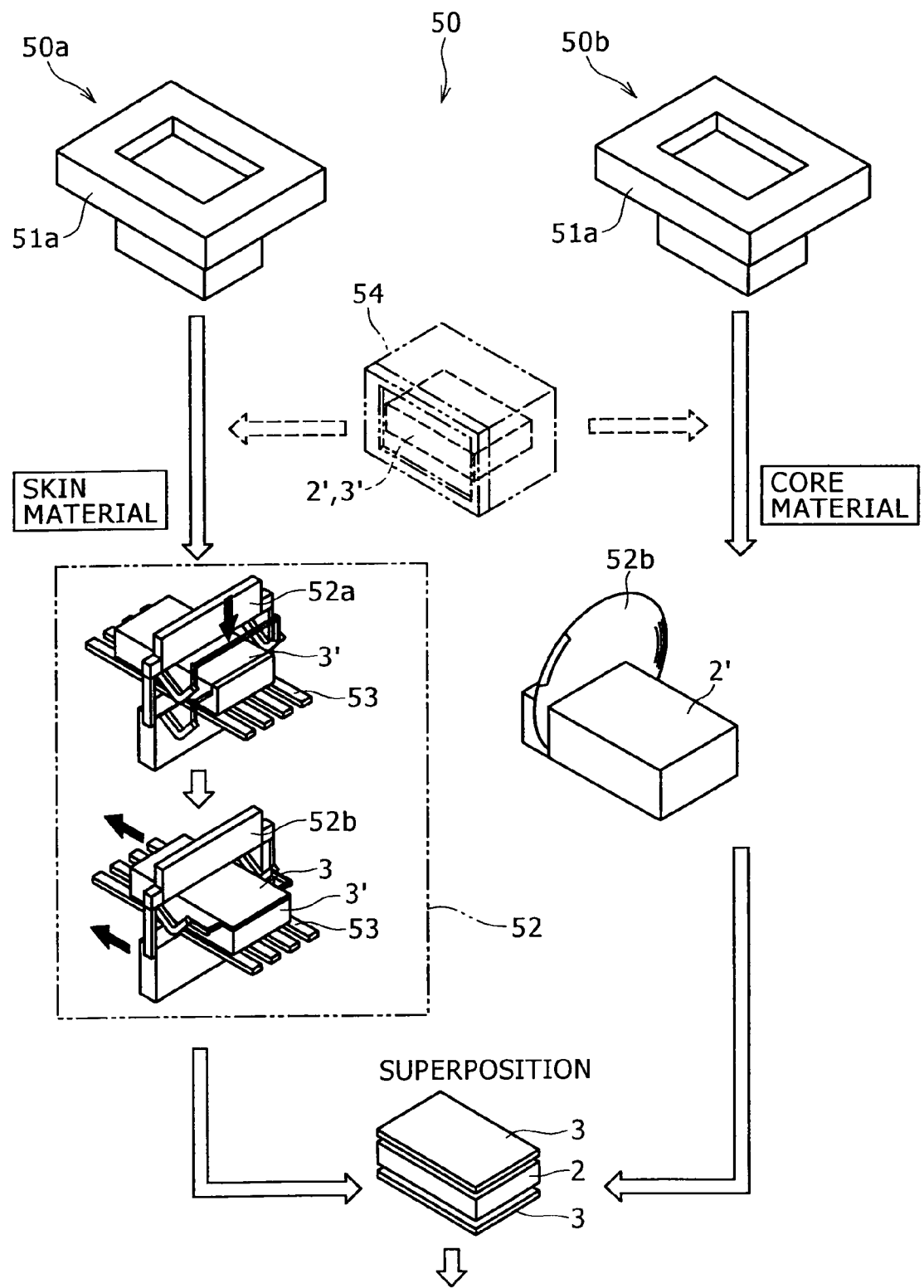
FIG. 12 is a schematic diagram illustrating the equipment for manufacturing a skin material according to the present invention.
Figure 13:
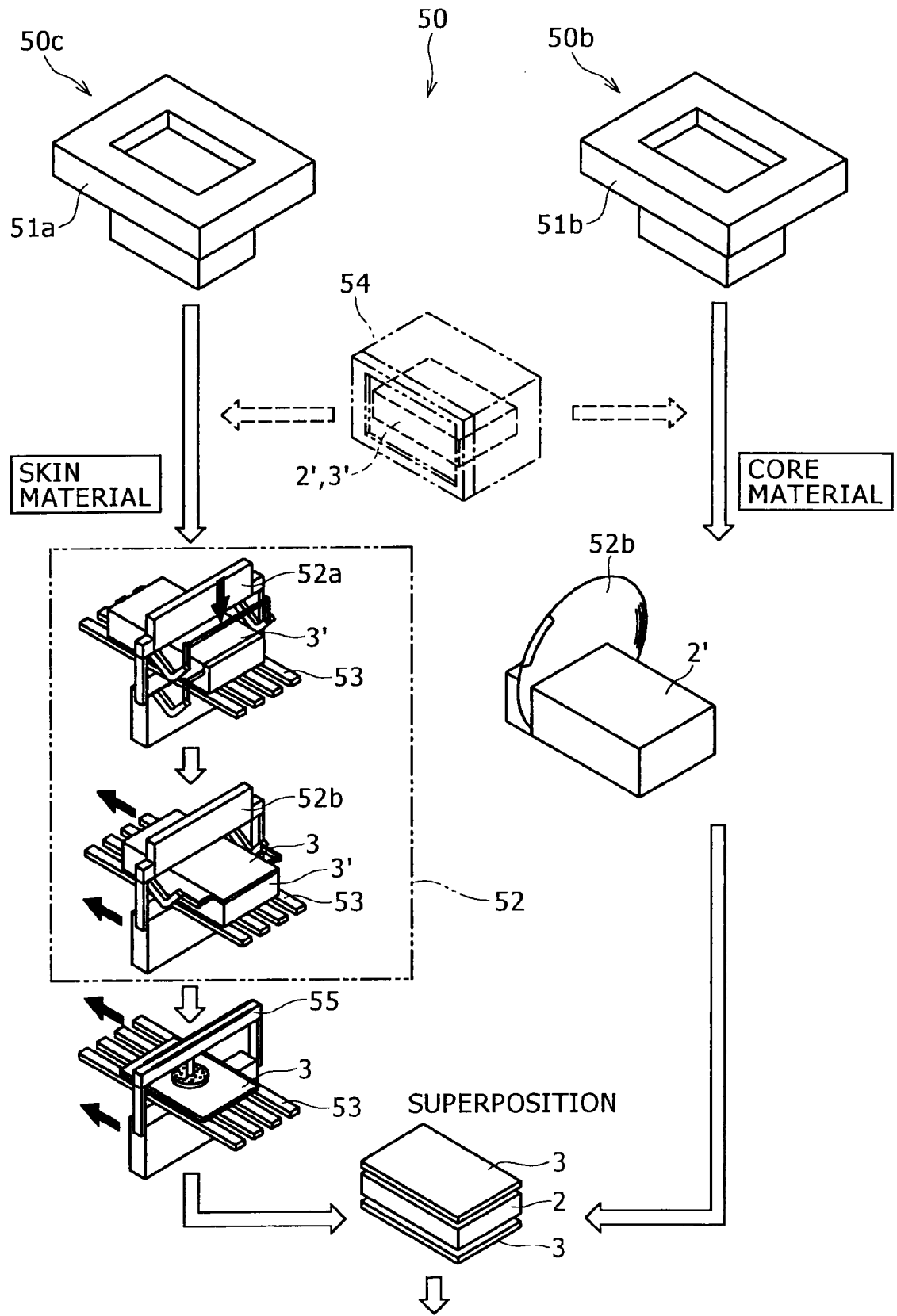
FIG. 13 is a schematic diagram illustrating another equipment for manufacturing a skin material according to the present invention.
Figure 14:
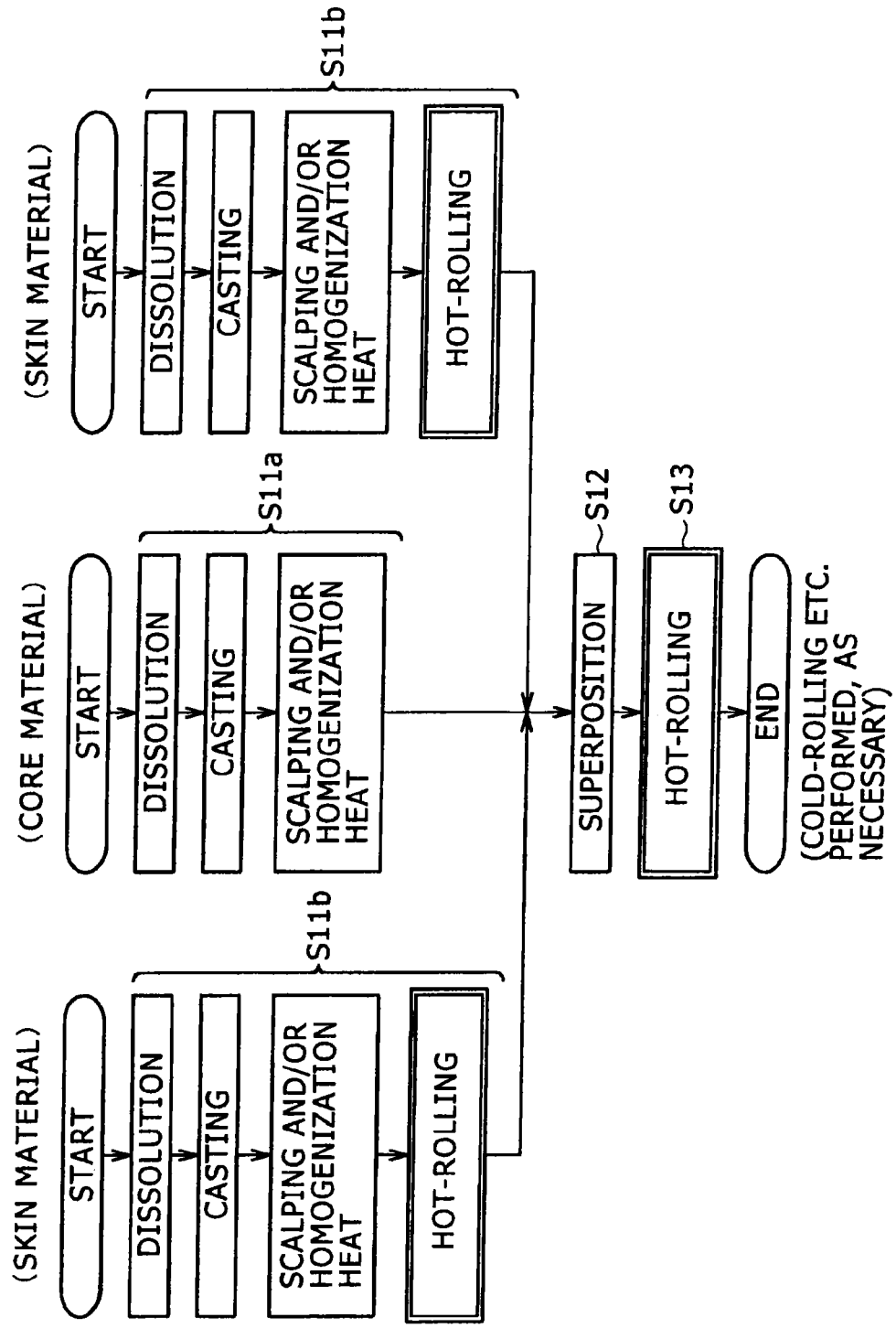
FIG. 14 is a diagram illustrating a flow of a method for manufacturing a conventional clad material.

As illustrated in FIG. 12, the equipment 50a for manufacturing a skin material 50 is the equipment for manufacturing a skin material 3 used for a clad material composed of the core material 2 and the one or more layers of the skin material 3, which are superposed on either one or both faces of the core material. The equipment 50a for manufacturing a skin material 50 includes: a casting apparatus 51a which casts the skin material 3 by dissolving the metal for skin material different from the core material 2 in their component compositions; an ingot cutting-apparatus 52 which cuts the ingot for skin material 3'; and a conveying apparatus 53 which conveys the ingot for the skin material 3' among each apparatus. The ingot cutting-apparatus 52 may be a slicing apparatus 52a which slices the ingot for skin material 3' into a predetermined thickness, or the ingot cutting-apparatus 52 may include the slicing apparatus 52a and a cutting apparatus 52b which cuts the ingot for skin material 3' at the front and the back portions thereof into a predetermined length. Further, according to need, the ingot cutting-apparatus 52 may be equipped with an apparatus for heat treatment for homogenization 54 used for performing a heat treatment for homogenization on the ingot for skin material 3' cast by the casting apparatus 51a.

Each apparatus will be described below.

[Casting Apparatus]

The casting apparatus 51a is, for example, the semi-continuous casting apparatus in which a molten metal for skin material different from the core material in their component compositions, is poured from the top and a solidified metal is taken out continuously from the bottom of the water-cooled casting mold to obtain the ingot for skin material 3' having a predetermined thickness.

[Apparatus for Heat Treatment for Homogenization]

The apparatus for heat treatment for homogenization 54 is used for performing a heat treatment for homogenization on the ingot for skin material 3' for removing the inner stress and homogenizing the inner structure thereof, as necessary. By performing the heat treatment for homogenization, the internal stress of the ingot for skin material 3' is removed, leading to an improved flatness of the sliced skin material 3.

[Ingot Cutting Apparatus]

The ingot cutting-apparatus 52 is used for cutting the ingot for skin material 3' cast by the casting apparatus 51a, and the apparatus may be a slicing apparatus 52b, or may include the slicing apparatus 52b and the cutting apparatus 52a.

(Cutting Apparatus)

The cutting apparatus 52a is used for cutting the ingot for skin material 3' at the front and the back portions thereof by a band saw in the depth direction so that the ingot for skin material 3' has a predetermined length. When cutting the ingot in this way, a dent or a protrusion formed at the front or back portion of the ingot for skin material 3' can be removed, leading to smooth faces at front and back portions of the ingot for skin material 3'. A circular saw, water pressure, or laser or the like can be adopted for cutting as well as a band saw; however, tools for cutting are not limited thereto. In addition, the side faces of the ingot for skin material 3' is cut when superposing the core material 2 and the skin material 3 one on another, which will be described later.

(Slicing Machine)

The slicing machine 52b slices the ingot for skin material 3' cast by the casting apparatus 51a into a predetermined thickness by, for example, a band saw. The band saw includes an endless-type band saw which cuts while rotating. The ingot for skin material 3' can be sliced by putting the edge of the band saw on one of the front or the back faces of the ingot, then by rotating the edge to cut the ingot, further by the slicing machine 52b moving toward the other side of the back or the front faces of the ingot. By repeating the operation, the ingot for skin material 3' is sliced into a predetermined thickness and multiple skin materials 3 can be manufactured. The ingot for skin material 3' may be sliced into a predetermined thickness by transferring the ingot 3', with the slicing machine 52b being fixed.

It is preferable that the ingot for skin material 3' is sliced in parallel to the installation face of the ingot for skin material 3' installed horizontally. Herein, the installation face means the face of the ingot for skin material 3' which is in contact with the installation stand of the slicing machine. By slicing the ingot in this way, the influence by the weight of a cut lump (slice lump) or the displacement by a shape (for example, the force produced when the cut lump is falling down, etc.), is minimized, therefore, the flatness of a sliced skin material can be improved.

The thickness of the sliced skin material is preferably in the range of 10 to 250 mm. When the thickness of the sliced skin material 3 is outside the range, the clad rate of a clad material is apt to be inappropriate. Herein, the edge of the band saw may be formed two or more stages not one stage. By forming the edge of the band saw in multiple stages, the slice process of the ingot for skin material 3' can be improved in its efficiency. The band saw used in the slicing machine 52b may be a usual one, and as a slicing tool, a circular saw, water pressure, laser or the like can be adopted; however, tools for slicing are not limited thereto.

In cutting the ingot for skin material 3', either one of cutting the ingot for skin material 3' at the front and the back portions thereof by the cutting apparatus 52a, or slicing the ingot for skin material 3' by the slicing apparatus 52, may be performed first. Herein, the above cutting apparatus 52a and the slicing apparatus 52b are structured as different apparatuses; however, cutting the front and back portions of the ingot for skin material 3', and slicing the ingot for skin material 3', may be performed by one apparatus.

[Conveying Apparatus]

The conveying apparatus 53 is used for conveying the ingot for skin material 3' among the above casting apparatus 51a, the cutting apparatus 52a, and the slicing apparatus 52b; however, the conveying apparatus 53 may convey the ingot for skin material 3' or the skin material 3 among other apparatuses. As the conveying apparatus 53, an apparatus provided with a belt conveyor or a roller or the like can be adopted; however, the apparatus is not limited thereto, and an apparatus in which the ingot for skin material 3', or the skin material 3 is conveyed by hanging them with a wire, a chain, or vacuum or the like.

5.2. Other Equipment for Manufacturing Skin Materials

Modifications of the equipment for manufacturing skin materials will be exemplified below. As illustrated in FIG. 13, the equipment 50c for manufacturing skin materials is the equipment for manufacturing the skin material 3 used in a clad material composed of the core material 2 and one or more layers of the skin material 3 which are superposed on either one or both faces of the core material 2. The equipment for manufacturing the skin material 3 includes: a casting apparatus 51a which casts the skin material 3 by dissolving a metal for skin material different from the core material in their component compositions; an ingot-cutting apparatus 52 which cuts the ingot for skin material 3'; an apparatus for surface smoothing treatment 55 which performs a surface smoothing treatment; and a conveying apparatus 53 which conveys the ingot for skin material 3' or the skin material 3 among each apparatus. The ingot-cutting apparatus 52 may be the slicing apparatus 52b which slices the ingot for skin material 3' into a predetermined thickness. Alternatively, the ingot-cutting apparatus 52 may be provided with the slicing apparatus 52b and the cutting apparatus 52a which makes the ingot have a predetermined length by cutting the ingot for skin material 3' at the front and the back portions of the ingot. The ingot-cutting apparatus may be provided with an apparatus for heat treatment for homogenization 54 which performs a heat treatment for homogenization on the ingot for skin material 3' cast by the casting apparatus 51a, as necessary.

Each apparatus will be described below. Herein, explanation of the casting apparatus 51a, the apparatus for the treatment for homogenization 54, the cutting apparatus 52a, and the slicing apparatus 52b, will be omitted because they are the same as described before.

[Conveying Apparatus]

The conveying apparatus 53 is used for conveying the ingot for skin material 3' or the skin material 3 among the above the casting apparatus 51a, the cutting apparatus 52a, and the slicing apparatus 52b; however, the conveying apparatus may convey the ingot for skin material 3' and the skin material 3 among other apparatuses. As the conveying apparatus 53, an apparatus provided with a belt conveyor or a roller or the like can be adopted; however, the apparatus is not limited thereto, and an apparatus in which the ingot for skin material 3', or the skin material 3 is conveyed by hanging them with a wire, a chain, or vacuum or the like. The skin material 3 is conveyed, after the ingot for skin material 3' is sliced into a predetermined thickness by a band saw, by hanging the sliced skin material 3 with the use of vacuum then by conveying it onto the machine platen of the apparatus for surface smoothing treatment. The skin material 3 may be conveyed onto the machine platen of the apparatus for surface smoothing treatment by moving the skin material 3 on the conveying apparatus 53.

[Apparatus for Surface Smoothing Treatment]

The apparatus for surface smoothing treatment is used for smoothing the surface of the skin material 3 sliced by the slicing apparatus 52b. The skin material 3 conveyed by the above conveying apparatus 53 is subjected to a surface smoothing treatment by the apparatus for surface smoothing treatment 55. The back face of the skin material 3 may be subjected to a surface smoothing treatment after reversing the skin material 3 by a reversing apparatus. As for surface smoothing treatment, a cutting method, such as an end mill cutting, a diamond bite cutting; a grinding method which faces a surface by a grind rocks or the like; and a polishing method such as a buffing, or the like, can be adopted; however, methods for surface smoothing treatment are not limited thereto. As a method for surface smoothing treatment, a plurality of methods may be adopted in combination, such as the case where scalping is performed after cutting.

At least one layer of the skin material 3 may be manufactured by the above equipment for manufacturing skin materials 50a or 50c, and the other layer or layers may be manufactured by conventional equipment for manufacturing skin materials.

The equipment for manufacturing clad materials 50 using the above equipment for manufacturing skin materials 50a or 50c, will be described below. The equipment for manufacturing clad materials 50 includes: the above equipment for manufacturing skin materials 50a or 50c; the equipment for manufacturing core materials 2 composed of a casting apparatus 51b which dissolves and casts a metal for core material different from the skin material, and a cutting apparatus 52b which makes the ingot for core material 3' cast by the casting apparatus 51b, have a predetermined length by cutting the ingot 3' in the lengthwise direction; an apparatus for superposition (not illustrated) which makes a superposed material by superposing the skin material 3 and the core material 2 one on another; and an apparatus for hot-rolling (not illustrated) which hot-rolls the superposed material.

[Equipment for Manufacturing Skin Material]

Herein, explanation of the equipment for manufacturing skin materials 50a or 50c will be omitted because the equipment is the same as described before.

[Equipment for Manufacturing Core Materials]

(Casting Apparatus)

In the casting apparatus 51b of the equipment 50b for manufacturing the core material, a molten metal for core material, which is dissolved by, for example, the semi-continuous casting in the dissolution process and different from the skin material 3 in their component compositions, is poured from the top, and a solidified metal is taken out continuously from the bottom of the water-cooled casting mold to obtain the ingot for core material having a predetermined thickness.

(Cutting Apparatus)

The cutting apparatus 52b is used for cutting the ingot for core material 2' cast by the casting apparatus 51b by a circular saw into a predetermined size. A band saw, water pressure, and laser or the like as well as a circular saw can be adopted as cutting tools; however, the tools are not limited thereto.

[Apparatus for Superposition]

The apparatus for superposition makes a superposed material by superposing the skin material 3 or the multiple skin materials 3 on either one or both faces of the core material 2, which is manufactured in the above process, at predetermined positions. As for a method for superposition, a known method, for example, a method in which the both end portions of the core material 2 and the skin material 3 are strapped with a band, is adopted. Other methods, for example, fixation by welding may be adopted. A superposed material thus manufactured may be subjected to a heat treatment for homogenization by using the apparatus for heat treatment for homogenization 54 in order to remove the inner stress and make the hot-rolling performed easily, as necessary.

[Apparatus for Hot-rolling]

(Hot-rolling)

In the hot-rolling process, the above band for fixing the superposed material is cut and a clad material is manufactured by hot-rolling the superposed material. As for a method for hot-rolling, a known method for rolling is adopted. A rolling apparatus to be used may be a two-stage rolling apparatus or a four or more-stage rolling apparatus as well as a four-stage rolling apparatus. Hot-rolling may be repeated to obtain a clad material having a predetermined thickness by using a rolling apparatus provided with multiple rows of roll-stands as well as a rolling apparatus provided with a row of roll-stand.

(Cold-rolling)

A clad material thus manufactured is subsequently subjected to a cold-rolling treatment, as necessary. A cold-rolling process may be performed on condition that a rolling reduction rate is in the range of 30 to 99%, as an example.

The clad material may be subjected to a heat treatment (annealing process), a distortion correction process, or an aging treatment or the like with the use of common methods in order to provide a desired mechanical property or the like, or may be processed to a certain shape, or may be cut into a certain size, as necessary. As an example, examples of annealing processes include a rough annealing performed prior to the cold-rolling, an intermediate annealing performed between the cold-rolling, processes and a final annealing performed after the final cold-rolling, which are performed at 200 to 500° for 0 to 10 hours in a continuous furnace or a batch furnace, can be cited; however, such processes or treatments are not limited thereto, and it is needless to say that such processes or treatments may be performed with the conditions being changed appropriately, as long as the processes or treatments provide an advantage (mechanical property).

As stated above, according to the equipment for manufacturing skin materials of the present invention, it is not required that the thickness of a skin material is reduced by hot-rolling as with a conventional clad material, therefore there is no need for using a hot-rolling apparatus in manufacturing a skin material, leading to the labor saving in operation processes. In addition, because the surface state and the flatness of the skin material can be readily controlled, the flatness and the smoothness of the skin material can be improved and further the thickness of an oxide film can be also reduced. Further, in superposing the skin material on the core material, because the adhesion property and the press-bonding property between the core material and the skin material are improved, therefore the number of passes of hot-rolling can be reduced, leading to an improved yield rate and an improved productivity. Moreover, a gap between the core material and each skin material is rarely formed, therefore leading to an improved corrosion resistance.

The method for manufacturing a clad material and the equipment for manufacturing the clad material have been described above; however, nothing in the description should be interpreted to limit the spirit and the scope of the present invention. The scope of the present invention should be interpreted solely based on the description in the following claims. And a person skilled in the art should understand that there are many alterations and modifications possible without departing from the spirit and the scope of the present invention and those alterations and modifications are also effective as embodiments of the present invention.

The invention claimed is:

1. A method for manufacturing a clad material composed of a core material and one or more skin materials that are superposed on either one or both faces of the core material, the method for manufacturing the clad material comprising:
   a core material preparation process where an ingot for core material is manufactured by melting, mixing and casting a metal for core material in a core material preparation process;
   a skin material preparation process where an ingot for skin material is manufactured by melting, mixing and casting a metal for skin material different from the core material in their component compositions, without hot rolling the ingot for skin material;
   a superposition process where the ingot for skin material, which has not been hot rolled, is superposed as a skin material at a predetermined position of either one or both faces of the ingot for core material to manufacture a superposed material; and
   a clad hot-rolling process where the superposed material is hot-rolled to manufacture a clad material,
   wherein, in the skin material preparation process, at least one of the skin materials is manufactured by a slice process where an ingot for skin material manufactured by being melted, mixed and cast is sliced into a predetermined thickness, and
   wherein, after the slice process, the surface of the sliced skin material having a predetermined thickness is further subjected to a surface smoothing treatment.

2. The method for manufacturing the clad material according to claim 1, wherein the ingot for skin material manufactured by being melted, mixed and cast is further subjected to a heat treatment for homogenization, prior to the slice process.

3. The method for manufacturing the clad material according to claim 1, wherein, in the slice process, the ingot for skin material is sliced in parallel to an installation face of the ingot for skin material installed horizontally.

4. The method for manufacturing the clad material according to claim 1, wherein, in the core material preparation process, at least one of a scalping process and a heat treatment for homogenization is performed on the manufactured ingot for core material.

5. The method for manufacturing the clad material according to claim 1, wherein, in the skin material preparation process, at least one of a scalping process and a heat treatment for homogenization is performed on the manufactured skin material.

6. The method for manufacturing the clad material according to claim 1, wherein at least one of the skin materials has a flatness of equal to or less than 1 mm per 1 m in a lengthwise direction.

7. The method for manufacturing the clad material according to claim 1, wherein at least one of the skin materials has an arithmetic mean roughness (Ra) of a surface roughness in the range of 0.05 to 1.0 μm.

8. The method for manufacturing the clad material according to claim 1, wherein a thickness of the ingot for core material is in the range of 200 to 700 mm, and a thickness of the skin material is in the range of 3 to 200 mm.

9. The method for manufacturing the clad material according to claim 1, wherein the metal for core material and the metal for skin material are aluminum or aluminum alloys.

10. The method for manufacturing the clad material according to claim 1, wherein the skin material is composed of a plurality of layers, and at least one of the layers of the skin material is manufactured by the skin material preparation process.

11. The method for manufacturing the clad material according to claim 1, wherein the surface smoothing treatment is performed by one or more methods selected from a cutting method, a grinding method, and a polishing method.

12. The method for manufacturing the clad material according to claim 1, wherein the method further comprises a cold-rolling process where cold-rolling is performed after the hot-rolling process.

13. The method for manufacturing the clad material according to claim 10, wherein at least one layer of the skin material is a filler material and the filler material is provided so as to be placed on the side of the outermost surface in the clad material, and wherein at least one layer of the skin material including the filler material is manufactured by the skin material preparation process.

14. The method for manufacturing the clad material according to claim 10, wherein the skin material is provided with the filler material and an intermediate material which is provided between the core material and the filler material, and the filler material is provided so as to be placed on the side of the outermost surface in the clad material, and wherein at least one layer including the filler material and the intermediate material is manufactured by the skin material preparation process.

15. The method for manufacturing the clad material according to claim 10, wherein the clad material is composed of the core material and the skin materials which are superposed on both faces of the core material; at least one layer of the skin materials on one face of the core material is a filler material, and at least one layer of the skin materials on the other face of the core material is a sacrificial material, and the filler material and the sacrificial material are provided so as to be placed on the side of the outermost face in each face of the core material; and at least one layer of the skin materials including the filler material and at least one layer of the skin materials including the sacrificial material are manufactured by the skin material preparation process, respectively.

16. The method for manufacturing the clad material according to claim 10, wherein the clad material is composed of the core material and the skin materials which are superposed on both faces of the core material; the skin material on one face of the core material is provided with a filler material and an intermediate material which is provided between the core material and the filler material, and at least one layer of the skin materials on the other face of the core material is a sacrificial material, and the filler material and the sacrificial material are provided so as to be placed on the side of the outermost surface in each face of the core material; and at least one layer of the skin materials including the filler material and the intermediate material, and at least one layer of the skin materials including the sacrificial material, are manufactured by the skin material preparation process, respectively.

17. A method for manufacturing a clad material which is composed of a core material and two or more skin materials which are superposed on either one or both faces of the core material, the method for manufacturing the clad material comprising:
- a core material preparation process where an ingot for core material is manufactured by melting, mixing and casting a metal for core material;
- a skin material preparation process where an ingot for skin material is manufactured by melting, mixing and casting a metal for skin material different from the metal for core material in their component compositions, without hot rolling the ingot for skin material;
- a rolled plate for skin material preparation process where a rolled plate for skin material is manufactured by hot-rolling the ingot for skin material;
- a superposition process where a superposed material is manufactured by superposing the ingot for skin material, which has not been hot rolled, and the rolled plate for skin material as skin materials at a predetermined position on either one or both faces of the ingot for core material; and
- a clad hot-rolling process where a clad material is manufactured by hot-rolling the superposed material,
- wherein, in the skin material preparation process, at least one of the skin materials is manufactured by a slice process where an ingot for skin material manufactured by being melted, mixed and cast is sliced into a predetermined thickness, and
- wherein, after the slice process, the surface of the sliced skin material having a predetermined thickness is further subjected to a surface smoothing treatment.

18. The method for manufacturing the clad material according to claim 17, wherein the thicknesses of the ingot for skin material and the hot-rolled plate for skin material are in the range of 3 to 200 mm.

* * * * *